(12) United States Patent
Maruyama

(10) Patent No.: US 12,382,407 B2
(45) Date of Patent: Aug. 5, 2025

(54) RESOURCE CONTROL FOR SYSTEM LOGGING

(71) Applicant: Hitachi, Ltd., Tokyo (JP)

(72) Inventor: Tatsuya Maruyama, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 385 days.

(21) Appl. No.: 17/945,948

(22) Filed: Sep. 15, 2022

(65) Prior Publication Data

US 2024/0098660 A1    Mar. 21, 2024

(51) Int. Cl.
| | |
|---|---|
| *H04J 3/06* | (2006.01) |
| *H04W 4/02* | (2018.01) |
| *H04W 56/00* | (2009.01) |
| *H04W 72/0446* | (2023.01) |
| *H04W 72/0453* | (2023.01) |

(52) U.S. Cl.
CPC ......... *H04W 56/001* (2013.01); *H04W 4/027* (2013.01); *H04W 72/0446* (2013.01); *H04W 72/0453* (2013.01)

(58) Field of Classification Search
CPC ............... H04W 56/001; H04W 4/027; H04W 72/0446; H04W 72/0453; H04W 56/0015; H04W 56/002
USPC ........................................................ 370/350
See application file for complete search history.

(56) References Cited

U.S. PATENT DOCUMENTS

2016/0198470 A1* 7/2016 Koorapaty ............ H04W 72/00 370/330
2017/0161151 A1* 6/2017 Jacques Da Silva ....................... G06F 11/1464
2018/0139717 A1* 5/2018 Vered ...................... H04L 67/12
2021/0029655 A1* 1/2021 Lindoff ............. H04W 74/0833
2024/0172146 A1* 5/2024 Lin ................... H04W 56/0015

FOREIGN PATENT DOCUMENTS

| JP | 4442338 B2 | 3/2010 |
|---|---|---|
| JP | 2013167493 A | 8/2013 |
| JP | 2015512182 A | 4/2015 |
| WO | 2013110849 A1 | 8/2013 |
| WO | 2022106632 A1 | 5/2022 |

OTHER PUBLICATIONS

Office Action issued in Japanese Patent Application No. 2023-147329, mailed Jul. 16, 2024, 11 pages.

* cited by examiner

*Primary Examiner* — Chuong T Ho
(74) *Attorney, Agent, or Firm* — Procopio, Cory, Hargreaves & Savitch LLP

(57) ABSTRACT

In example implementations described herein, there are an apparatus, systems, and methods for identifying a state of a plurality of synchronized devices at a particular time. The method may further include allocating, based on the identified state of each of the plurality of synchronized devices, a set of time-synchronization resources for transmitting time-synchronization information from at least one device in the plurality of devices. The method may also include transmitting a control message to the at least one device in the plurality of devices indicating the allocated set of time-synchronization resources determined for transmitting the time-synchronization information from the at least one device.

18 Claims, 20 Drawing Sheets

RESOURCE CONTROL FOR SYSTEM LOGGING

BACKGROUND

Field

The present disclosure is generally directed to control systems for collaborative systems in which humans and machines (e.g., devices, robots, mechatronics, etc.) work together.

Related Art

Control systems for supporting social infrastructure has been constructed in closed spaces, which have been isolated physically and electronically from the human being. However, the recent advancements of mechatronics, control technologies, information technologies and the like aims at collaboration between human and the control systems. A demand for flexibility in dealing with the shortage of labor population and the diversification of social needs in developed countries promotes the trend.

An example of such collaborative control systems is collaborative robots. The collaborative robots, which satisfy particular conditions, can work in the same space as the person. To meet the above-mentioned needs, the collaborative robots may eventually provide work force and achieving the flexibility of control systems. Although these collaborative systems are still constrained, it is expected that collaborative systems will move toward realization to harmonize with humans by autonomous and flexible actions based on the advancement of AI technologies and inspecting human behaviors in the future.

One issue in realizing the human collaborative control system is the guarantee for safety and the improvement of the efficiency as a control system. Because human collaborative control systems assume the cooperation with humans, it is a major premise not to harm humans compared to the conventional automation systems. Thus, ensuring safety is indispensable.

Furthermore, human collaborative control systems generally tend to sacrifice efficiency and performance to prioritize the guarantee for safety in comparison with the conventional automation system. For example, the operation speed of a collaborative robot is typically limited whenever a human is close the robot for safety. In such a case, the performance as a control system is lowered than the conventional automation control system.

In recent years, 5G has been considered as a wireless standard intended to be applied to control systems. The introduction of 5G to control systems is expected to promote high-quality control systems composed of autonomous entities. A plurality of autonomous entities such as Automated Guided Vehicle (AGVs) and Autonomous Mobile Robot (AMRs) in a factory, and autonomous driving are especially the control targets. A challenge is how to realize the human cooperative control systems including such autonomous entities and humans when considering the social demand for the human cooperative control systems.

SUMMARY

Example implementations described herein involve an innovative method to dynamically allocate communication and/or compute resources for communication with a control system based on a state of the controlled (terminal) devices. The example implementations, in some aspects guarantee safety and improve efficiency for the human collaborative control systems including multiple autonomous entities.

Aspects of the present disclosure include a method which can include identifying a state of a plurality of synchronized devices at a particular time. The method may further include allocating, based on the identified state of each of the plurality of synchronized devices, a set of time-synchronization resources for transmitting time-synchronization information from at least one device in the plurality of devices. The method may also include transmitting a control message to the at least one device in the plurality of devices indicating the allocated set of time-synchronization resources determined for transmitting the time-synchronization information from the at least one device.

Aspects of the present disclosure include a non-transitory computer readable medium, storing instructions for execution by a processor, which can include instructions for identifying a state of a plurality of synchronized devices at a particular time. The instructions may further include instructions for allocating, based on the identified state of each of the plurality of synchronized devices, a set of time-synchronization resources for transmitting time-synchronization information from at least one device in the plurality of devices. The instructions may also include instructions for transmitting a control message to the at least one device in the plurality of devices indicating the allocated set of time-synchronization resources determined for transmitting the time-synchronization information from the at least one device.

Aspects of the present disclosure include a system, which can include means for identifying a state of a plurality of synchronized devices at a particular time; means for allocating, based on the identified state of each of the plurality of synchronized devices, a set of time-synchronization resources for transmitting time-synchronization information from at least one device in the plurality of devices; and means for transmitting a control message to the at least one device in the plurality of devices indicating the allocated set of time-synchronization resources determined for transmitting the time-synchronization information from the at least one device.

Aspects of the present disclosure include an apparatus, which can include a processor, configured to identify a state of a plurality of synchronized devices at a particular time. The processor may further be configured to allocate, based on the identified state of each of the plurality of synchronized devices, a set of time-synchronization resources for transmitting time-synchronization information from at least one device in the plurality of devices. The processor may also be configured to transmit a control message to the at least one device in the plurality of devices indicating the allocated set of time-synchronization resources determined for transmitting the time-synchronization information from the at least one device.

DETAILED DESCRIPTION

Figure 1:
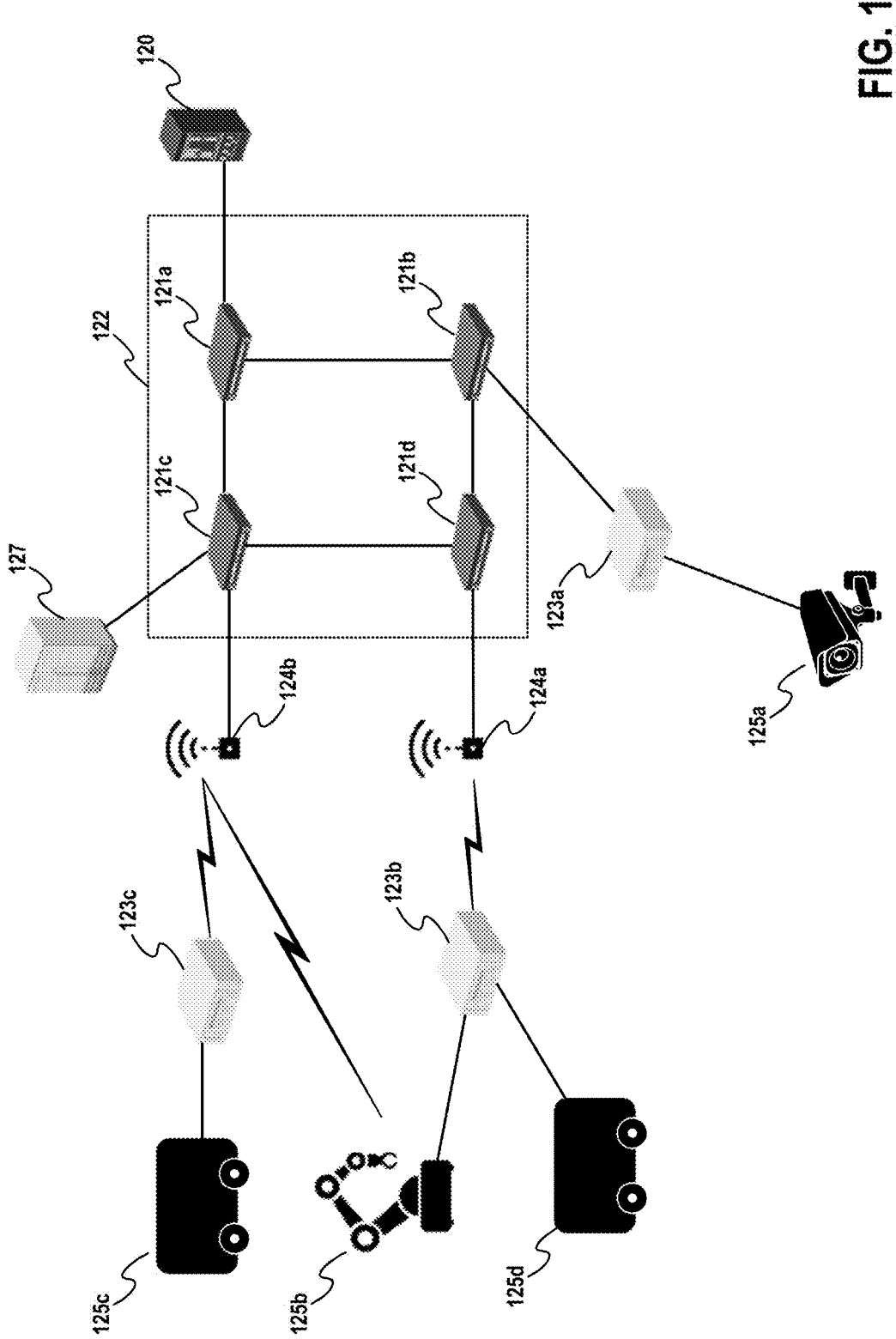
FIG. 1 illustrates an example configuration of a control system including a resource control apparatus in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve an innovative method to dynamically allocate communication and/or compute resources for communication with a control system based on a state of the controlled (terminal) devices. Aspects of the present disclosure include a method which can include identifying a state of a plurality of synchronized devices at a particular time. The method may further include allocating, based on the identified state of each of the plurality of synchronized devices, a set of time-synchronization resources for transmitting time-synchronization information from at least one device in the plurality of devices. The method may also include transmitting a control message to the at least one device in the plurality of devices indicating the allocated set of time-synchronization resources determined for transmitting the time-synchronization information from the at least one device.

FIG. 1 illustrates an example configuration of a control system including a resource control apparatus in accordance with an example implementation. A resource control apparatus 120 may communicate with one or more elements of a communication network 122. The communication network may include one or more network relay devices, e.g., network relay device 121a, network relay device 121b, network relay device 121c, or network relay device 121d. The communication network may include one or more wireless base stations, e.g., wireless base station 124a or wireless base station 124b, input/output (I/O) control devices, e.g., I/O control device 125a, I/O control device 125b, I/O control device 125c, or I/O control device 125d, and a control device, e.g., control device 127. The resource control apparatus 120 may communicate with one or more terminal devices, e.g., terminal device 123a, terminal device 123b, or terminal device 123c, via the control network 122 and/or a wireless network (e.g., the network including a network relay device 121a-121d and wireless base station 124a or 124b).

A resource control apparatus 120 may transmit and/or receive communication packets (generally "communicate") with network relay devices 121a-121d, terminal devices 123a-123c, wireless base stations 124a or 124b, I/O control devices 125a-125d, and/or control device 127 to control (allocate) resources associated with the terminal devices 123a-123c and/or I/O control devices 125a-125d. The resource control apparatus 120 may further communicate with one or more elements of the control network 122, the I/O control devices 125a-125d, and/or the terminal devices 123a-123c to acquire control commands, measurement values, and/or sensor information from the devices for determining states of terminal devices 123a-123c and/or I/O control devices 125a-125d.

A resource control apparatus 120, in some aspects, may be implemented as a virtualized control device and/or as a software container providing the control device functionality. In some aspects, applications or an Operating System (OS) may be managed as a container by the virtualization. Depending on the desired implementation, the physical implementation of a resource control apparatus 120 can involve a dedicated controller, an industrial Personal Computer (PC), a distributed control system (DCS) controller, a Multi-access Edge Computing (MEC) device, a computer cloud, a server computer, a Supervisory Control and Data Acquisition (SCADA) server, and so on. Alternatively, a configuration where such devices are deployed in a destination network (DN) defined in 5G standards is exemplified as well.

A network relay device 121a-121d, in some aspects, may be a relay device in the control network 122. Packets communicated among the resource control apparatus 120, the terminal devices 123a-123c, the I/O control devices 125a-125d, the control devices 127, and the network relay device 121a-121d, in some aspects, may be routed and transferred.

Depending on the desired implementation, the physical implementation of a network relay device 121a-121d may be in the form of a Time Sensitive Network (TSN)-compatible switch, a network switch including a L2 switch or a L3 switch, a Software Defined Network (SDN)-compatible device, a Network Function Virtualization (NFV)-compatible device, a bridge, a router, an IEEE 1588 TC (Transparent Clock) or BC (Boundary Clock), an OpenFlow™ switch, a RedBox or a QuadBox defined by IEC 62439-3, an optical switch, an optical oscillator, and/or other various network relay apparatuses.

Control network 122, in some aspects, may be a network for connecting the resource control apparatus 120, the network relay devices 121a-121d, the terminal devices 123a-123c, and the wireless base stations 124a and/or 124b, the I/O control devices 125a-125d, and the control devices 127. The physical implementation of the control network 122 may be compatible with any standard, including any IEEE 802.3 (Ethernet) standard, the IEC 61784 standard; the IEC 61784-2 Communication Profile Family 12 (hereinafter, EtherCAT™) standard; IEEE communication standards related to TSN; the High availability Seamless Redundancy (HSR) and Parallel Redundancy Protocol (PRP) in the IEC 62439-3 standard; OpenFlow™; other control communication; and/or various wireless communication; a wireless network such as a core network of 4G, 5G, and/or 6G; the DNP (Distributed Network Protocol) 3 standard; the IEC 61970 standard; a duplex network; a ring network; the IEEE 802.17 RPR standard; a CAN™ (Controller Area Network); a DeviceNet; the RS-232C standard; the RS-422 standard; the RS-485 standard; the ZigBee™ standard; the Bluetooth™ standard; the IEEE 802.15 standard; the IEEE 802.1 standard; mobile communications; ECHONET Lite™; OpenADR™; and/or various wireless communication such as Wi-Fi™ and/or an industrial wireless network.

In addition, IEC 61850, OPC UA (Unified Architecture), DDS (Data Distribution Service), IEC 61850-7-420, IEC 60870-5-104, communication protocols based on Service Based Interface (SBI), REST API, HTTP/2, OpenAPI, exchange of JSON are examples of the upper layer protocol. Alternatively, the above-mentioned protocols may be layered. For example, the contents of the data are in the TSN packet is exemplified to apply the OPC UA standard.

Terminal devices 123a-123c, in some aspects, may be connected with an I/O control device 125a-125d such as a sensor or an actuator. Terminal devices 123a-123c may control and configure the I/O control devices 125a-125d in accordance with a resource control command received from the resource control apparatus 120 via the control network 122. Terminal device 123a-123c may also control and configure the I/O control devices 125a-125d in accordance with a control command received from the control device 127 via the control network 122. Further, the terminal devices 123a-123c may transmit their state and information of the I/O control devices 125a-125d to the resource control apparatus 120 via the control network 122. Terminal devices 123a-123c and/or I/O control devices 125a-125d may be configured to provide information (e.g., input to the resource control apparatus 120 and/or the control device 127) as a sensor, to receive information (e.g., output from the resource control apparatus 120 and/or the control device 127) as an actuator, or may combine both transmission and/or reception (e.g., input and/or output) functions in accordance with the desired implementation.

Terminal devices 123a-123c may be implemented as a dedicated controller, an industrial PC, a control computer, a DCS controller, a SCADA device, a programmable logic controller (PLC), a terminal device such as smartphone and UE equipped with a wireless communication interface, an intelligent electronic device (IED), a merging unit (MU), and/or a protection relay. For convenience, terminal devices 123a-123c may be described as a single device, but may consist of controllers, sensors, actuators, and a communication device such as a UE used in mobile communication.

Wireless base station 124a and/or 124b, in some aspects, may be a base station for wireless communication and may communicate with the terminal devices 123a-123c as a mobile object without a wired connection and/or an I/O control device 125a-125d via the wireless network. In addition, the wireless base station 124a and/or 124b may communicate with the resource control apparatus 120 and control device 127 via the control network 122. Examples of the wireless base station 124a and/or 124b may involve a base station of a 4G network, a 5G network, a 6G network, industrial wireless communication such as WirelessHART and ISA100, and so on. Wireless base station 124a and/or 124b may include multiple devices such as a Baseband Unit (BU), a Remote Radio Head (RRH), a Central Unit (CU), and/or a Distributed Unit (DU) in accordance with a configured option associated with a Function Split (FS).

I/O control devices 125a-125d, in some aspects, may be a device such as a sensor, an actuator, or both. It may be connected with a terminal device 123a-123c and controlled by the terminal devices 123a-123c. Examples of I/O control devices 125a-125d can involve an industrial robot such as a mobile robot, a humanoid robot, a robotic arm, an Automated Guided Vehicle (AGV), an Autonomous Mobile Robot (AMR), a remote-controlled mobile object, a chip mounter, a machine tools table, processing equipment, a machine tool, semiconductor manufacturing equipment, a motor or an inverter in a manufacturing device, power equipment such as a circuit breaker and a disconnector, various sensor (encoders, temperature sensors, pressure sensors, etc.), and so on in accordance with the desired implementation.

The wireless network, in some aspects, is a wireless network for connecting the wireless base station 124a and/or 124b and the terminal devices 123b-123c. Depending on the desired implementation, the physical implementation of the wireless network can be in the form of mobile radio communication such as 3G, 4G (LTE, etc.), 5G (including New Radio system), and 6G, wireless communication such as Wi-Fi™, ZigBee™, Bluetooth™, and/or IEEE 802.15. While FIG. 1 illustrates a wireless network used to connect the control network 122 to the terminal devices 123b-123c, in some aspects the terminal devices 123a-123c may be connected to the control network 122 by a wired communication, e.g., Ethernet, USB, and/or other wired communication.

Control device 127, in some aspects, may communicate with one or more of terminal devices 123a-123c and the I/O control devices 125a-125d via control network 122 (e.g., the network including network relay devices 121) and wireless network. Control device 127 may transmit and/or receive communication packets with a terminal device 123a-123c and/or the I/O control devices to (1) transmit control command values for controlling terminal devices 123a-123c and/or I/O control devices 125a-125d, (2) acquire measurement values and/or sensor information from components such as sensors or actuators of the I/O control devices 125a-125d, or (3) acquire and/or configure various settings of the terminal devices 123a-123c and/or the I/O control devices 125a-125d. Depending on the desired implementation, the physical implementation of the control device 127 can involve a PC, a dedicated controller, an industrial PC, a control computer, a DCS controller, a Multi-access Edge Computing (MEC) device, a computer cloud, a server computer, a SCADA (Supervisory Control and Data Acquisition) server, a PLC (programmable logic controller), an IED (intelligent electronic device), a protection relay of a power system, and so on. Alternatively, a configuration where such devices are deployed in a destination network (DN) defined in 5G standards is exemplified as well. They may exchange sampling data, control commands, and/or state signals in a control system. The data in the control system can be integrated in a packet. Control device 127, in some aspects, may be implemented as a virtualized control device and/or as a software container providing the control device functionality. In some aspects, applications or an Operating System (OS) may be managed as a container by the virtualization.

Though the communication path between the control device 127 and the network relay device 121c, is illustrated as a single connection, any number of paths may be used to achieve redundancy. Each of communication links may be a communication link connecting any of the resource control apparatus 120, the network relay device 121a-121d, the wireless base station 124a and/or 124b, the terminal devices 123a-123c, the control device 127, and constitutes the control network 122. A communication link, as used herein, may refer to a communication link between neighboring communication devices (e.g., network relay devices 121a to 121d, wireless base stations 124a and 124b, the terminal devices 123a-123c, and/or a control device 127). A communication path may refer to a route composed of a set of communication links.

In some aspects, the number, and configuration, of the network relay devices, the terminal devices and/or the wireless base stations may be different from the number, and configuration, of the network relay devices, the terminal devices and/or the wireless base stations illustrated in FIG. 1 based on the desired implementation. Similarly, the number of communication paths between a resource control apparatus 120 and a terminal device 123a-123c may be different from each other and from the number of communication paths illustrated in FIG. 1. While in FIG. 1 the resource control apparatus 120 and the terminal devices 123a-123c are illustrated as separate devices, in some aspects a communication device may involve both roles in one device depending on the desired implementation. In some aspects, there may be one or more resource control apparatus (e.g., control device 120) in the control system.

Examples of the control system shown in FIG. 1 may include a DCS for FA and PA, a remote control system using wireless communication, monitoring and protection control systems in power systems, industrial equipment, semiconductor manufacturing equipment, in-vehicle systems, control systems in construction machinery and railway vehicles, a railway ground signal system, aviation control systems, and so on. In some aspects, an Internet of Things (IoT) system may be used to improve the performance of the control system by applying artificial intelligence to information collected via the control network 122 at the resource control apparatus 120 and/or at the control device 127 or a cloud or a computer is also applicable. These examples may involve local 5G, private 5G, and public 5G system.

Figure 2:
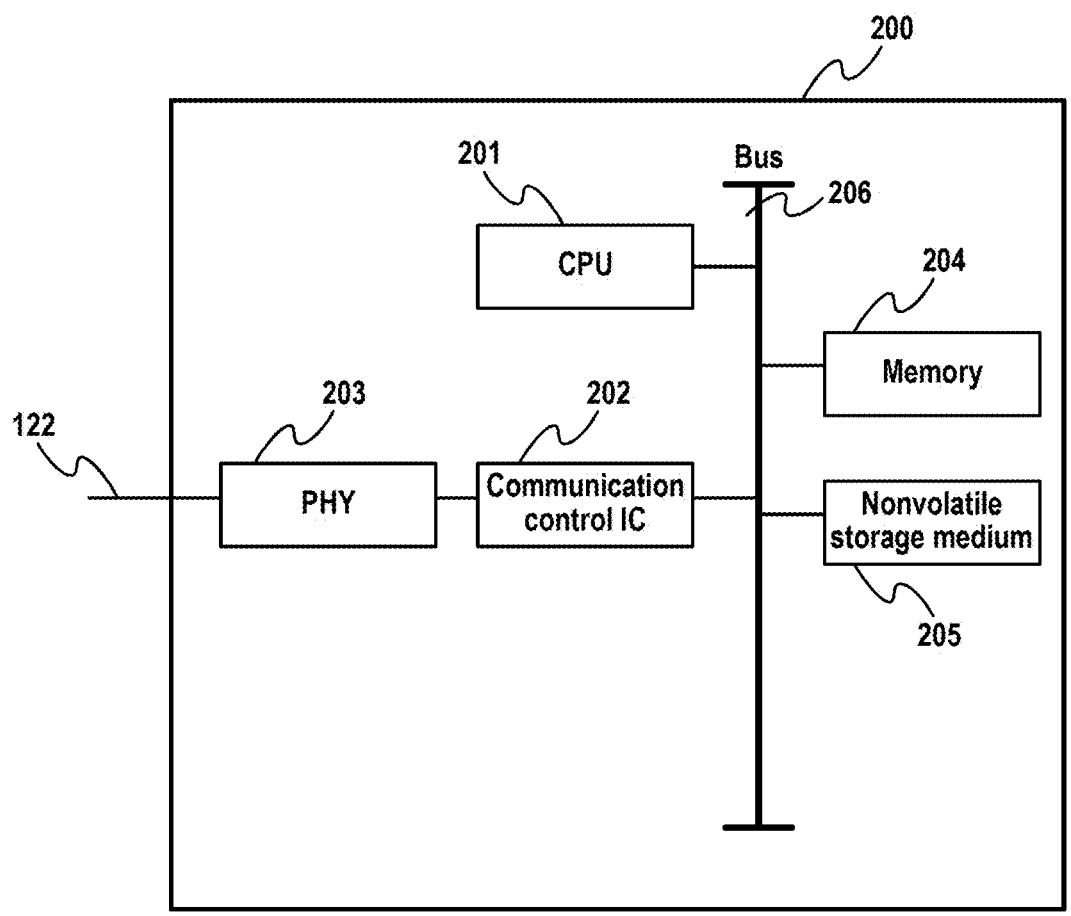
FIG. 2 illustrates a hardware structure of a device, in accordance with an example implementation.

FIG. 2 illustrates a hardware structure of a device 200, in accordance with an example implementation. Device 200 may be a resource control apparatus and/or a control device. In some aspects, the hardware structure may include a Central Processing Unit (CPU) 201 that may be configured to transfer programs from the nonvolatile storage medium 205 to the memory 204 and executes the programs. The OS and application programs operating on the OS are exemplified as the execution programs. Programs operating on the CPU 201 operate settings of the communication control integrated circuit (IC) 202 and obtain the state information.

Communication control IC 202 may receive transmission requests and transmission data from software running on the CPU 201, and may transmit data to the control network 122 using physical layer (PHY) 203. Also, the communication control IC 202 may transfer the data received from the control network 122 to the CPU 201, the memory 204, and/or the nonvolatile storage medium 205 via the bus 206. An implementation of the communication control IC 202 is a Field Programmable Gate Array (FPGA), a Complex Programmable Logic Device (CPLD), an Application Specific Integrated Circuit (ASIC), an IC such as gate arrays, and so on in accordance with the desired implementation. In some aspects, the communication control IC 202 may be integrated with, or be implemented by, the CPU 201. The communication control IC 202 may be an IEEE 802.3 communication device including Media Access Control (MAC) layer and/or PHY layer. The implementation of the communication control IC 202 may be an IEEE 802.3 MAC chip, a PHY chip, and/or a MAC/PHY composite chip.

In some aspects, the communication control IC 202 may be included in CPU 201 or a chip set that controls the information path inside a computer. Further, in the structure of FIG. 2, only the single communication control IC 202 is shown, but there may be a plurality of communication control ICs. In some aspects, PHY 203 may be a transceiver IC that implements the communication function with the control network 122. The communication function provided by PHY 203 may be based on the IEEE 802.3 communication standard. In the structure of FIG. 2, the PHY 203 and the communication control IC 202 are connected and the IEEE 802.3 MAC processing is included in the communication control IC 202. However, in some aspects, a MAC function IC may be placed between the communication control IC 202 and PHY 203, or the PHY 203 which is capable of the MAC function may be incorporated into the communication control IC 202.

While FIG. 2 illustrates a single PHY 203, other implementations may include multiple PHY components. The memory 204, in some aspects, may be a temporary storage area for CPU 201 to operate. For example, the memory 204 may store OS and application programs transferred from the nonvolatile storage medium 205. Nonvolatile storage medium 205, in some aspects, may be a storage for information used to store programs for operating the CPU 201 such as an OS, applications, and device drivers among other data and may also store execution results of the programs. Examples of the nonvolatile storage medium 205 can involve a hard disk drive (HDD), a solid state drive (SSD), and/or a flash memory. Further, nonvolatile storage medium 205 can be implemented as an external removable storage medium such as floppy disk (FD), CD, DVD, Blu-ray™, USB memory, compact flash, and so on.

Bus 206 connects the CPU 201, the communication control IC 202, the memory 204, the nonvolatile storage medium 205. Examples of bus 206 can include a Peripheral Component Interconnect (PCI) Bus, PCI Express bus, on-chip bus, and so on. The device 200 may include a plurality of communication interfaces of the communication control IC 202 and PHY 203 for high reliability based on communication path redundancy.

Figure 3:
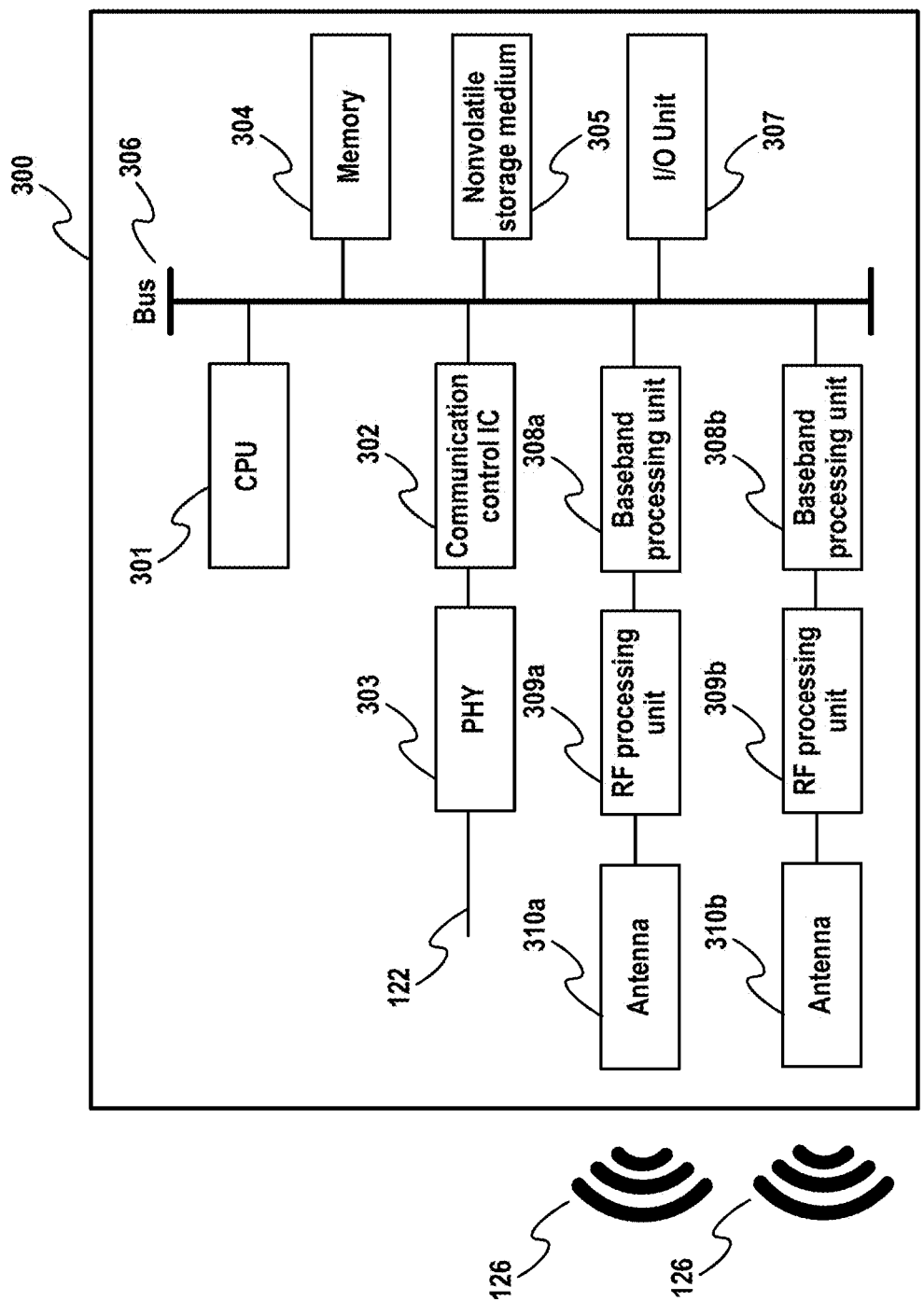
FIG. 3 illustrates a hardware structure of a device in accordance with example implementations.

FIG. 3 illustrates a hardware structure of a device 300 in accordance with example implementations. The device 300 may be one of a terminal device (e.g., one of terminal devices 123a-123c) and/or an I/O control device (e.g., one of I/O control devices 125a-125d). I/O unit 307 may be an input-output interface for controlling actuators associated with the device 300 (e.g., an I/O control device) or acquiring a sensed value from sensors associated with the device 300. Examples of I/O unit 307 can involve digital I/O interfaces, analog I/O IC, and driver IC. Although the signal line from the I/O unit 307 is shown in singular, there can be a plurality of lines depending on the device 300 (e.g., the terminal device or I/O control device). Also, a plurality of the I/O units 307 may be included in the device 300 (e.g., the terminal device or I/O control device).

Bus 306 connects the CPU 301, the communication control IC 302, the memory 304, the nonvolatile storage medium 305. Examples of bus 306 can include a Peripheral Component Interconnect (PCI) Bus, PCI Express bus, on-chip bus, and so on. The device 300 may include a plurality of communication interfaces of the communication control IC 302 and PHY 303 for high reliability based on communication path redundancy.

The I/O unit 307, in some aspects, may be configured to input information from a connected and/or associated sensor, to output a command to a connected and/or associated actuator, or may combine both input and output functions in accordance with the desired implementation. Baseband processing unit 308a and/or 308b may be configured to convert analog and digital signals with a radio frequency (RF) processing unit 309a and/or 309b and execute the signal processing of the digital data. Examples of signal processing include Fast Fourier Transform (FFT) of Orthogonal Frequency Division Multiplexing (OFDM), matrix calculation in MIMO signals, and error correction.

Depending on the desired implementation, the physical implementation of baseband processing unit 308a and/or 308b can involve a dedicated IC, an FPGA, a CPLD, an ASIC, an IC such as gate arrays, and so on. Alternatively, it may be constituted by integrating with the CPU 201 or/and RF processing unit 309a and/or 309b. RF processing unit 309a and/or 309b, in some aspects, may perform radio frequency processing such as modulation of the analog RF signal, amplification of a high-frequency signal, switching of radio frequency, and/or a filter function. For example, the RF processing unit 309a and/or 309b may be implemented as a dedicated IC. Antenna 310a and/or 310b may be an antenna device according to the standard of the wireless network. Some aspects may include more than two of each of the baseband processing unit 308, the RF processing unit 309a and/or 309b, and the antenna 310a and/or 310b that are illustrated in the configuration of FIG. 3.

In some aspects, a plurality of terminal devices (e.g., terminal devices 123a-123c) with a baseband processing unit 308, a RF processing unit 309a and/or 309b, and an antenna 310a and/or 310b are connected via inter-chip communication means (not shown) for cooperation. A plurality of such terminal devices (e.g., terminal devices 123a-123c), in some aspects, are connected with an integration hardware (e.g., the structure of FIG. 2 and FIG. 3) via inter-chip communication means, then the integration hardware may control them. In some aspects, the hardware components (e.g., the I/O unit 307, the baseband processing unit 308, the RF processing unit 309a and/or 309b, and/or the antenna 310a and/or 310b) may be implemented as separate components that are connected by a network via the PHY 303, or by inter-chip communication means (not shown) to the other components of the terminal device (e.g., terminal devices 123a-123c) illustrated in FIG. 3.

In some aspects, any of the baseband processing unit 308, the RF processing unit 309a and/or 309b, the antenna 310a and/or 310b may be omitted if wireless connection is not needed. A terminal device (e.g., terminal devices 123a-123c) may have a communication means for connecting with a I/O control device (e.g., an I/O control device 125a-125d). In some aspects, the terminal device (e.g., terminal devices 123a-123c) has a plurality of sets of communication control IC 202 and PHY 203, and one of sets is for connection with the control network 122, and the other is for connection with an I/O control device (e.g., one of I/O control device 125a-125d). Alternatively, the I/O unit 307 may be a means of connecting to an I/O control device (e.g., one of I/O control device 125a-125d).

Figure 4:
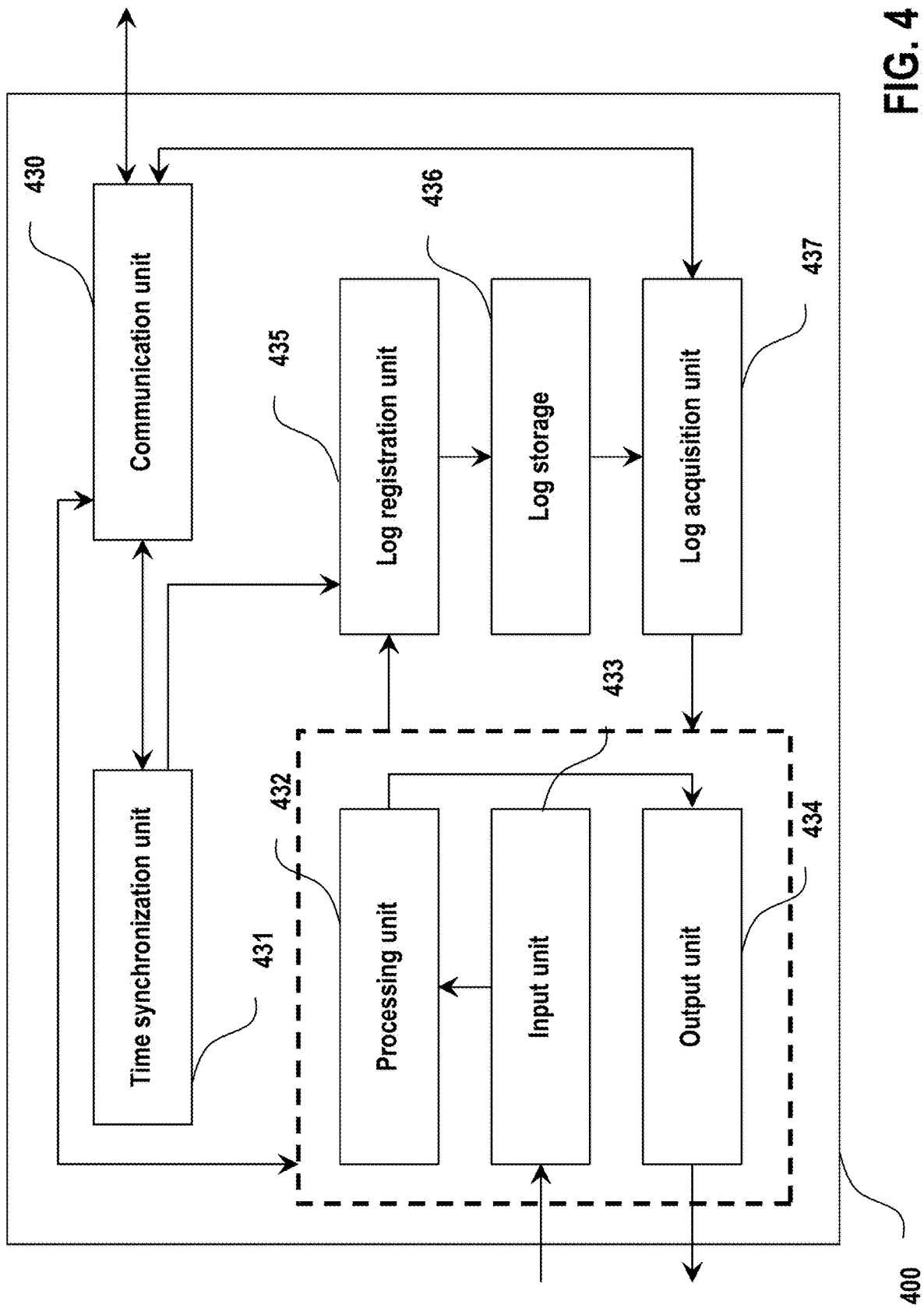
FIG. 4 illustrates a functional structure of a device in accordance with example implementations.

FIG. 4 illustrates a functional structure of a device 400 in accordance with example implementations. The device 400 may be one of a terminal device (e.g., one of terminal devices 123a-123c) and/or an I/O control device (e.g., one of I/O control devices 125a-125d). Communication unit 430 may connect with the control network 122 or the wireless network and communicate in accordance with the communication protocol of the control network 122 or the wireless network. A communication unit 430, in some aspects, connects with the PHY 303 to transmit and/or receive data and processes the data or packets that have been received from the bus 306. The processing at the communication unit 430 may include generating a frame from the data and/or calculating and adding of abnormal diagnostic data such as CRC. A communication unit 430 may be configured to transfer a received packet to any of the other functions on reception. While a singular communication unit 430 is shown in FIG. 4, a plurality of communication units 430 may be included in a terminal device (e.g., one of terminal devices 123a-123c). The communication unit 430 may be implemented by one or more of applications running on the CPU 201, the communication control IC 202, and the PHY 203.

Time synchronization unit 431 synchronize the time of the terminal device (e.g., one of terminal devices 123a-123c) and/or I/O control devices 125a-125d to a reference time. The time synchronization means can involve IEEE 802.1AS, IEEE 1588, NTP, GPS, a time synchronization means by wireless communication such as 5G, and so on. The time synchronization unit 431 may be implemented by one or more of CPU 201, applications running on the CPU 201, the communication control IC 202, and the PHY 203.

Processing unit 432, in some aspects, may execute processing such as control operation and information processing. In an example of the control operation, the processing unit 432 in the terminal device (e.g., one of terminal devices 123a-123c) or the I/O control device (e.g., one of I/O control devices 125a-125d) outputs the command value to actuators with the I/O unit 307 in accordance with command value received from a resource control apparatus 120 and/or control device 127, or control algorithm by the terminal device (e.g., one of terminal devices 123a-123c) and/or the I/O control devices 125a-125d itself. For the operation of these command values, the processing unit 432 may use sensor signals received from the I/O unit 307. In some aspects, the processing unit 432 in the terminal device (e.g., one of terminal devices 123a-123c) and/or the I/O control devices 125a-125d may acquire state information or sensor information via the I/O unit 307, apply processing to the information, and transmit the processed information to the resource control apparatus 120 and/or the control device 127. For example, the processing may include a filtering operation, statistical processing, and/or a statistical calculation for a set of the sensor information for a specified time in the past.

Other processing examples may include control processing based on control theory such as feedback control theory and/or feed forward control theory or a control operation based on artificial intelligence (AI) or machine learning. For example, integral control and a state-machine-based control method, which changes its state depending on the past information and input, may be used. Other processing examples may involve asset management such as failure detection or risk state estimation, device management and software version control (software version management and updating, etc.), predictive and preventive maintenance, Condition Based Maintenance (CBM), and statistical calculation by AI or machine learning for a remaining life prediction for the I/O control devices (e.g., one of I/O control devices 125a-125d).

Processing unit 432 may also be configured to calculate a command value required for controlling the I/O control device (e.g., one of I/O control devices 125a-125d). For example, the I/O control device (e.g., one of I/O control devices 125a-125d) may calculate a moving direction and a target position, speed control, acceleration control, stop, deceleration, and so on if the I/O control device (e.g., one of I/O control devices 125a-125d) is a mobile object. For example, if the I/O control device (e.g., one of I/O control devices 125a-125d) is an industrial robot arm, the I/O control device (e.g., one of I/O control devices 125a-125d) may calculate control commands for the motor of each joint, control of the end position of the robot arm, and trajectory control of the robot arm. The I/O control device (e.g., one of I/O control devices 125a-125d) may be any of a wide variety of devices, e.g., a complex device such as an industrial robot to a simple sensor or actuator, and the processing unit may be configured to execute control in accordance with the type of the I/O control device (e.g., one of I/O control devices 125a-125d). Processing unit 432 may be implemented by the CPU 201 or one or more applications running on the CPU 201.

Input unit 433, in some aspects, may be a sensor device. For example, the input unit 433 acquires physical information of an environment where the terminal device (e.g., one of terminal devices 123a-123c) and/or the I/O control device (e.g., one of I/O control devices 125a-125d) operate, or internal information of the terminal device (e.g., one of terminal devices 123a-123c) and/or the I/O control device (e.g., one of I/O control devices 125a-125d), then the input unit 433 provide the information for each functional unit. Input unit 433 may be implemented by the I/O unit 307 or the I/O control device (e.g., one of I/O control devices 125a-125d) as a sensor.

Output unit 434, in some aspects, may be an actuator device. For example, the output unit 434 outputs based on control commands processed by the processing unit 432, and works on a physical environment where the terminal device (e.g., one of terminal devices 123a-123c) and/or the I/O control device (e.g., one of I/O control devices 125a-125d) operate. Output unit 434 may be implemented by the I/O unit 307 or the I/O control device (e.g., one of I/O control devices 125a-125d) as an actuator.

Log registration unit 435, in some aspects, may record an event with the synchronized time provided by the time synchronization unit 431 as a log on log storage 436. The event to be registered is an operation by the processing unit 432, sensing by the input unit 433, or the output to an actuator by the output unit 434. Alternatively, the event may be a received control command from a control device 127 via the control network 122. The event may be represented as a format that can identified the event. For example, the format may be a string, and/or a numerical code representing the event. When a numerical code is used, the correspondence between the numerical code and the event is separately defined. The synchronized time used in the record is illustrated to follow a time format defined by the time synchronization protocol or the like. For example, IEEE 1588 defines a total of 10 bytes format with 6 bytes per second and 4 bytes per nanosecond. The synchronization time used for the record may be an absolute time, and may not be an absolute time as long as it is synchronized time in the control system of FIG. 1. Log registration unit 435 may be implemented by the CPU 201 or one or more applications running on the CPU 201.

Log storage 436, in some aspects, may store logs, which each log combines a synchronized time and an event registered by the log registration unit 435. Log storage 436 may be implemented as a database like a relational database. The log storage 436 may remove the data starting with the oldest data where the amount of data is full or exceeds a threshold. The log storage 436 may remove the information except for the information matched with specified conditions such as importance of the information. The log storage 436 may output the data to an external storage. Log storage 436 may be implemented by one or more of the CPU 201, applications running on the CPU 201, the memory 204, and the nonvolatile storage medium 205.

Log acquisition unit 437, in some aspects, may extract a log from the log storage 436 by a specified condition, and provide them for functional units which requires the information. The number of the logs is not limited to singular. Log acquisition unit 437 may process the acquired log information. The processing includes modification, complementation, and/or exclusion of the data, pre-processing the data, and/or adding or deleting a certain time to/from the synchronized time of the log information. The change of the synchronized time of the logs may maintain the time difference between the logs. Log acquisition unit 437 may be implemented by one or more of the CPU 201, applications running on the CPU 201, the memory 204, and the nonvolatile storage medium 205.

In some aspects, one or more of the log registration unit 435, the log storage 436, and the log acquisition unit 437 may be implemented as a standalone apparatus connected with the control network 122. For example, the log storage 436 is implemented as independent NAS (Network Attached Storage), and the log storage 436 may record a log information generated in the terminal device and transmitted from the terminal device (e.g., one of terminal devices 123a-123c) or from the I/O control devices (e.g., one of I/O control devices 125a-125d) via the control network 122. In some aspects, the log registration unit 435 and the log storage 436 may be implemented as a plurality of standalone apparatus, and connected with the control network 122. The log registration unit 435 may receive an event from the processing unit 432, the input unit 433, or the output unit 434, and register the event into the log storage 436. During the registration, the synchronized time comprising the log information may be the synchronized time provided by the time synchronization unit 431 in the terminal device (e.g., one of terminal devices 123a-123c) or in the I/O control devices (e.g., one of I/O control devices 125a-125d), or an independent apparatus having a time synchronization unit 431 may provide the synchronized time.

Figure 5:
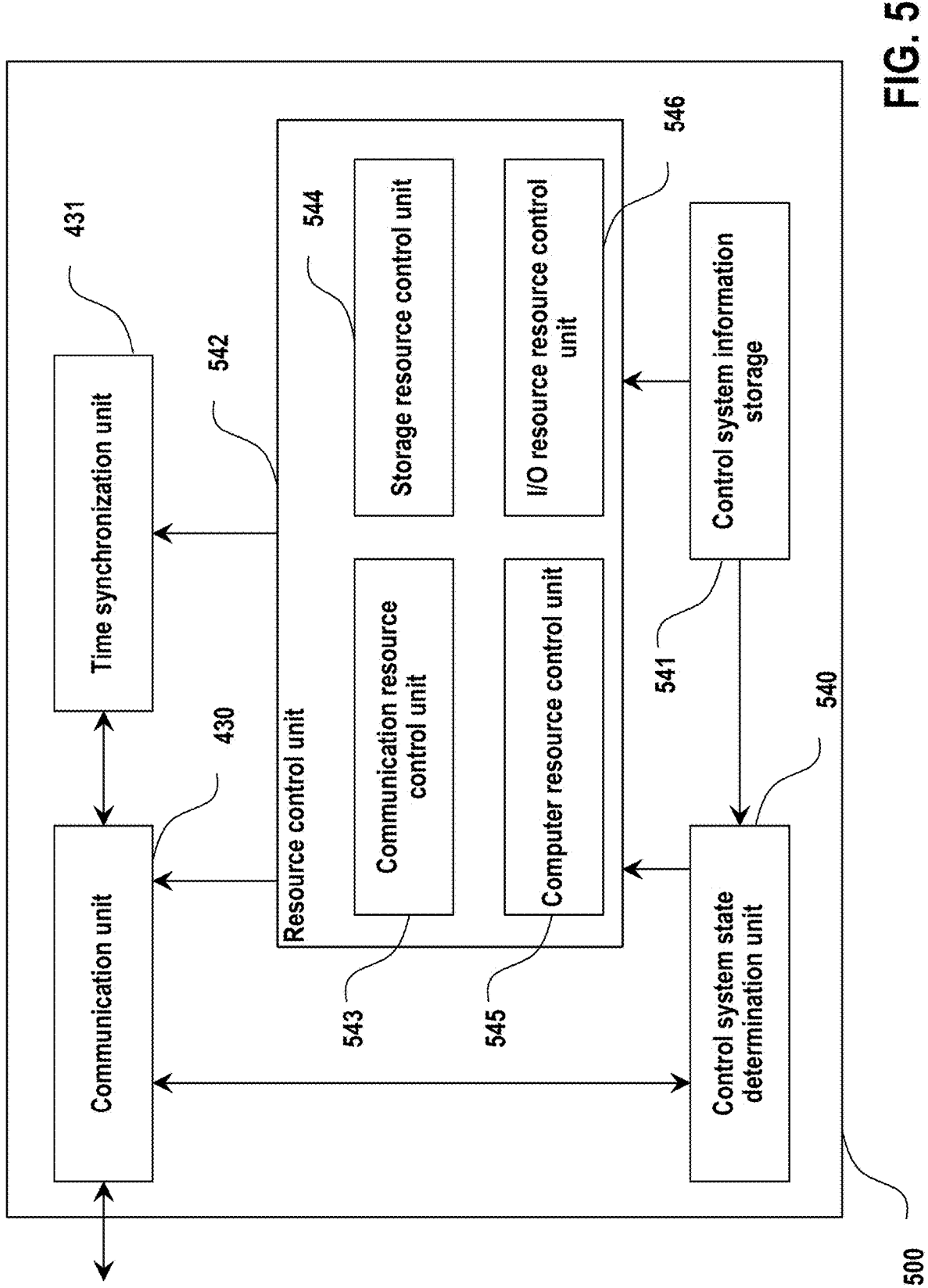
FIG. 5 illustrates the functional structure of a device in accordance with example implementations.

FIG. 5 illustrates the functional structure of a device 500 in accordance with example implementations. The device 500 may be a resource control apparatus 120. Control system state determination unit 540, in some aspects, may determine the state of the control system shown in FIG. 1. The determined state is not limited to the overall state of the system, it includes the state of each terminal device (e.g., one of terminal devices 123a-123c) or I/O control device (e.g., one of I/O control devices 125a-125d). The state, in some aspects, means the state of a terminal device, the I/O control device, and/or the control system comprised of the terminal device and/or the I/O control device where those relate to control method of log registration in the terminal device and the I/O control device.

Control system state determination unit 540 is shown in the functional structure of the device 500, but the control system state determination unit 540 may be implemented in the terminal device or the I/O control device (e.g., illustrated in FIG. 4). Alternatively, the control system state determination unit 540 may be distributed among the terminal devices, the I/O control devices, and the device 500 (e.g., the resource control apparatus 120), and the state is determined by the collaboration of the distributed control system state determination unit 540. Control system state determination unit 540 may be implemented by the CPU 201 or one or more applications running on the CPU 201.

Control system information storage 541, in some aspects, may store information on the control system shown in FIG. 1 and one or more terminal devices and I/O control devices. Such information, in some aspects, may include information of a plurality of information required to communicate with the set of terminal devices and I/O control devices (e.g., an IP address and MAC address). The information stored in control system information storage 541, in some aspects, may include information regarding a mobility of each I/O control device in the set of I/O control devices (whether each I/O control device is mobile or not), information about sensors and actuators associated with each terminal device or I/O control device, information about a computational power of each terminal device or I/O control device, information regarding a communication ability (e.g., which protocols may be used, a latency, or a bandwidth), an operational status (e.g., an On/Off state, a standby mode of operation, etc.) of each terminal device or I/O control device (or communication unit 430 of the terminal device or the I/O control device), an operation schedule, and so on. In some aspects, the control system information storage 541, may additionally store information regarding one or more of a set of resource control apparatus (e.g., resource control apparatus 120), the set of network relay devices (network relay devices 121a-121d), the control network 122, and/or the set of wireless base station (e.g., wireless base stations 124a and/or 124b).

The stored information may include the performance of the computer resources, communication performance, network topology, and so on. In some aspects, the information may include an identifier required for communication (IP address, etc.) and parameters related to communication settings for one or more of the components of the control network, an installed position and coverage area of a wireless base station (e.g., one of a wireless base station 124a and/or 124b). The information, in some aspects, may include physical information regarding the environment in which the terminal device and/or the I/O control device operate (e.g., width and length of a passage, and layout information in a plant, etc.). Control system information storage 541 may be configured as a database such as a relational database. Control system information storage 541 may be implemented by one or more of the CPU 201, applications running on CPU 201 (including a software container), memory 204, and/or nonvolatile storage medium 205.

Resource control unit 542, in some aspects, may control resources of the control system where the resources relates to log storing in the terminal device and I/O control device. Resource control unit 542 may include communication resource control unit 543, storage resource control unit 544, computer resource control unit 545, and I/O resource control unit 546. Resource control unit 542, in some aspects, may not include all of communication resource control unit 543, storage resource control unit 544, computer resource control unit 545, and I/O resource control unit 546.

Communication resource control unit 543, in some aspects, may control communication resources that relates to log storing in the terminal device and I/O control device. The resources controlled by communication resource control unit 543 includes communications of a time synchronization protocol executed by the terminal device and/or the I/O control device, and communications to configure and/or acquire a configuration related to one or more of the log registration unit 435, the log storage 436, and the log acquisition unit 437. In some aspects, the resources controlled by communication resource control unit 543, in some aspects, includes communication to notify one or more of the log registration unit 435, the log storage 436, and the log acquisition unit 437 of log information in case of that any of the log registration unit 435, the log storage 436, and the log acquisition unit 437 is configured as a standalone apparatus.

For these communications, the communication resource control unit 543 may assign resources of one or more of a network relay device, the control network 122, a wireless base station, a resource control apparatus, a terminal device, an I/O control device, and a control device (e.g., as illustrated in the system of FIG. 1). The resources, in some aspects, may include a communication path (or route) from an I/O control device to a resource control apparatus, communication resources in the control network 122 and/or the wireless network. The communication resources in the control network 122 and/or the wireless network may be one or more of communication bands in the network, frequency, a priority for the communication, time slots in IEEE 802.1Qbv (TSN), communication paths. A communication path is configured by route configuration for packets in a network relay device, the control network, a terminal device, and/or a wireless base station. Examples of the route configuration are configuring routing rules of the routing table in a network router, configuration of forwarding rules for packets in an OpenFlow controller, and specification of destination ports (e.g. VLAN) in a network switch.

Storage resource control unit 544, in some aspects, may control storage resources in a terminal device and/or a I/O control device. The resources may be assigned capacity of a storage device such as SSD, HDD, and RAM memory, sampling period for events to be stored, and/or sampling accuracy (i.e. sampling resolution, or the number of bits to format an event).

Computer resource control unit 545, in some aspects, may control computer resources in a resource control apparatus, a network relay device, a terminal device, a wireless base station, a I/O control device, and/or a control device. Such computer resources may be the number of assigned processor cores for specific task in a multiprocessor, scheduling priority and/or the number of assigned processor cores for applications executing the communications, assigned time of processor cores, priority and/or assigned communication bandwidth in the bus 206.

I/O resource control unit 546, in some aspects, may control I/O resources in a terminal device and/or a I/O control device. Such I/O resources may be set point and/or limit of position, moving direction, velocity, and/or acceleration. Resource control unit 542, communication resource control unit 543, storage resource control unit 544, computer resource control unit 545, and I/O resource control unit 546 may be implemented by the CPU 201 or one or more applications running on the CPU 201.

Figure 6:
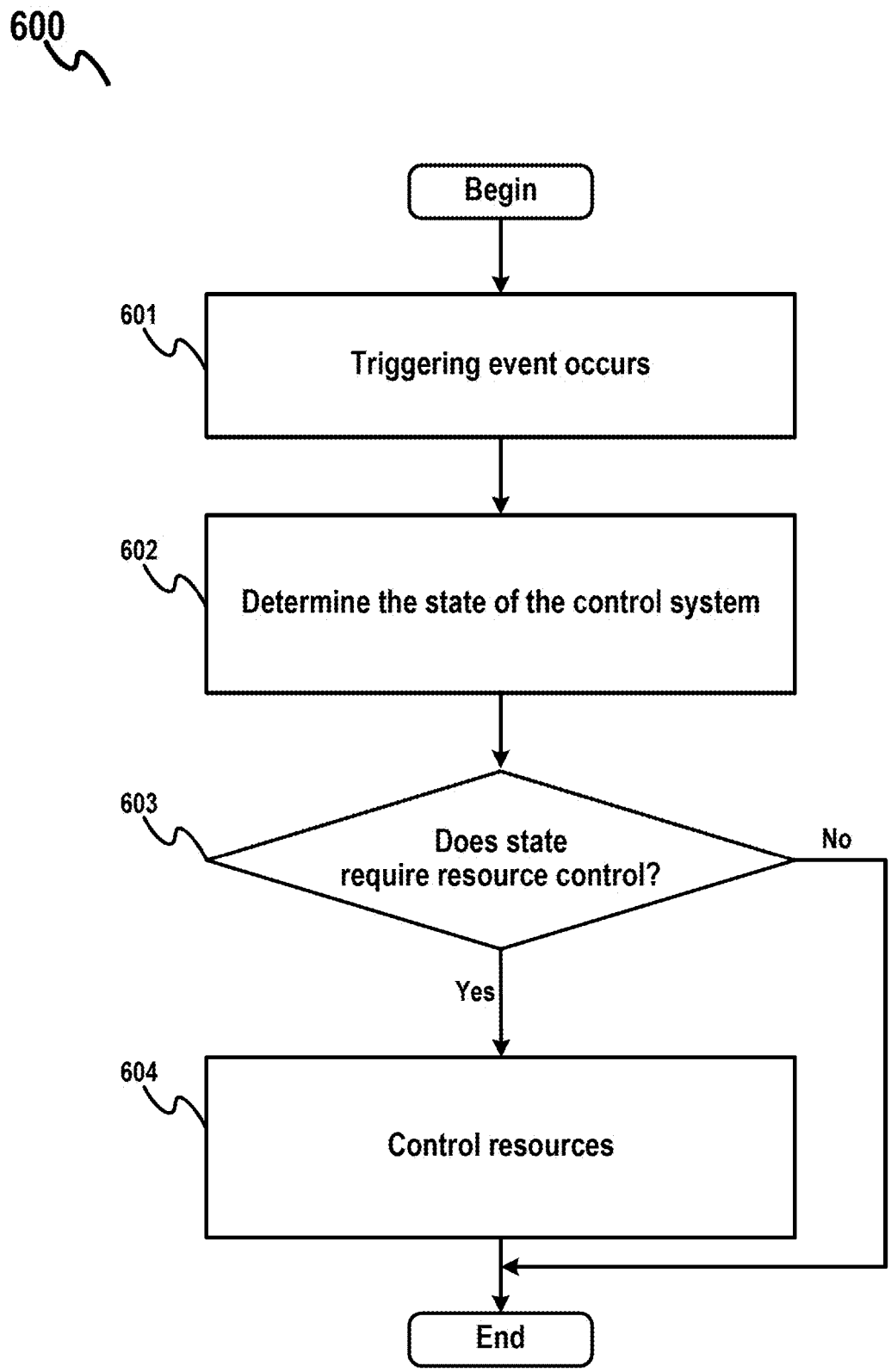
FIG. 6 is a flow diagram illustrating a method in accordance with some aspects of the disclosure.

FIG. 6 is a flow diagram 600 illustrating a method in accordance with some aspects of the disclosure. In some aspects, the method is performed by a resource control apparatus of a control system including, in some aspects, the device 500 (e.g., a resource control apparatus 120), or a computing device 2005 of FIG. 20 or a distributed computing device (e.g., a distributed set of computing devices) having similar components. At 601, the resource control apparatus (e.g., control system state determination unit 540) may determine and/or detect that a triggering event (e.g., an event triggering resource control) occurs. In some aspects, the triggering event determined and/or detected at 601 may be based on a type of the at least one device, a surrounding environment of the at least one device, or a change of a relation between the at least one device and at least one other device in the plurality of devices. For example, the triggering event may be related to the presence of a human (e.g., an introduction of a human in the environment), a changing distance to the at least one other device or the human, a change in the relative velocity between the at least one device and the at least one other device or the human, or a change in the relative acceleration between the at least one device and the at least one other device or the human. In order to determine and/or detect the triggering event the control system may monitor (e.g., execute a monitoring loop) for the triggering event Once the triggering event is determined and/or detected at 601, the resource control apparatus may determine, at 602, the state of the control system (e.g., determining and/or identifying a state of a plurality of synchronized devices associated with the control system at a particular time). In some aspects, the state of the control system determined at 602 may include a state of a set of terminal devices and a communication network (e.g., a state of the set of network relay devices, wireless base stations, I/O control devices, etc.) that provides communication between the control system and the terminal devices. The state of a terminal device, in some aspects, may include an identification of the type of device (e.g., a localized robotic agent, an autonomous object, or other controllable device), a set of transitory properties of the terminal device such as a velocity or an acceleration, an indication of whether the terminal device is in a dynamic state or a steady state, information regarding an environment of the terminal device, a location of the terminal device, information regarding a set of other objects in the vicinity of the terminal device (e.g., a type of object, a distance, a relative velocity, a relative acceleration, and/or other relevant information). The state of the communication network may include an identification of available paths and/or routes through the communication network to different terminal devices, resources (e.g., used and available resources) associated with each path and/or route through the communication network.

At 603, the resource control apparatus determines whether the state determined at 602 indicates for a resource control operation. The state determined at 602 may include one or more state variables that reflect changes from a previously determined state (e.g., a set of state variables determined based on a previously determined and/or detected triggering event). The changes to the state variables, in some aspects, may be used to determine, at 603, whether the state determined at 602 indicates for a resource control operation. For example, a state variable associated with one of a distance separating a terminal device from a human or a location or velocity of an autonomous device indicated and/or included in the state determined at 602 may have changed from a previously determined state.

If, based on the change to the state variable, the resource control apparatus determines, at 603, that the state determined at 602 indicates for a resource control operation, the resource control apparatus will proceed to perform, at 604, a resource control operation. For example, if the state variable associated with the distance separating the terminal device from the human indicates that a distance threshold is crossed (e.g., from above the threshold to below the threshold or vice versa), the resource control apparatus may determine, at 603, that the state determined at 602 indicates for a resource control operation (e.g., indicates that a resource control operation should be performed). Additionally, or alternatively, if the state variable associated with the location or velocity of the autonomous device indicates that the autonomous device has entered or exited an area associated with more frequent logging or that a velocity (e.g., either an absolute velocity or a velocity relative to other objects or autonomous devices) crosses a threshold velocity for more frequent logging, the resource control apparatus may determine, at 603, that the state determined at 602 indicates for a resource control operation. The resource control operation performed by the control system at 604 may include allocating, based on the state determined at 602 (e.g., the identified state of each of the plurality of synchronized devices), a set of time-synchronization resources for transmitting time-synchronization information from at least one device in the plurality of devices. The set of resource control operation performed by the control system at 604 may further include transmitting a control message to the at least one device in the plurality of devices indicating the allocated set of time-synchronization resources determined for transmitting the time-synchronization information from the at least one device.

In some aspects, the set of time synchronization resources may include one or more of time resources in a set of slots, frequency resources in a frequency range, bandwidth resources, or communication route resources. The set of time resources, in some aspects, may be associated with one or more of a wired communication network or a wireless communication network. As discussed above, the allocation of the set of time-synchronization resources may be based on one or more of a type of the at least one device, a surrounding environment of the at least one device, or a change of a relation between the at least one device and at least one other device in the plurality of devices as indicated in the state determined at 602. The allocation, in some aspects, may include updating a previous allocation of time-synchronization resources.

In some aspects, the set of time-synchronization resources includes a set of logging parameters for recording sensor data associated with at the at least one device, where the at least one device is configured to transmit information recorded by the at least one device based on the logging parameters to the resource control apparatus. The set of logging parameters, in some aspects, relates to one or more of a duration of each data recording event in a plurality of data recording events, a frequency of the data recording events in the plurality of data recording events, a resolution of sensor data collected during each data recording event in the plurality of data recording events, or an allocation for data storage for the sensor data collected during one or more of the data recording events in the plurality of data recording events. In some aspects, the resource control operation at 604 may be associated with multiple devices and a first set of logging parameters for a first device may indicate for the first device to begin recording data for a data recording event at a same time as at least one other device in the plurality of devices, e.g., a second device, begins recording data for the data recording event. The second set of logging parameters for the second device, in some aspects, indicates a frequency of the data recording events that is one of equal to the frequency of the data recording events indicated in the first set of logging parameters or is an integer multiple of the frequency of the data recording events indicated in the first set of logging parameters.

If, based on the change to the state variable, the resource control apparatus determines, at 603, that the state determined at 602 does not indicate for a resource control operation, or if the resource control operation has been performed by the resource control apparatus, the method may end. For example, if the state variable associated with the distance separating the terminal device from the human indicates that a distance threshold is not crossed (e.g., a distance remains within a same range as a previously determined and/or identified distance), the control system may determine, at 603, that the state determined at 602 does indicates for a resource control operation (e.g., indicates that a resource control operation is not triggered by the current state). Additionally, or alternatively, if the state variable associated with the location or velocity of the autonomous device indicates that the autonomous device is in a same area associated with a current logging configuration or that a velocity (e.g., either an absolute velocity or a velocity relative to other objects or autonomous devices) has not crossed a threshold velocity associated with more and/or less frequent logging, the control system may determine, at 603, that the state determined at 602 does not indicate for a resource control operation. The method will then end. In some aspects, the end of the method illustrated in flow diagram 600 may be followed by monitoring for a triggering event that will begin the method again.

In some aspects, parameters associated with the resources controlled by the resource control apparatus may control, at 604, a transmission frequency of packets in a time synchronization protocol, a sampling frequency of events, sampling resolution of events, and/or storage capacity allocation for events. The resources controlled by the resource control apparatus may, in some aspects, include a set of timeslots and/or a frequency band in wireless communication, timeslots for time division communication such as time sensitive networking (TSN), and/or route selection of the synchronization packets from the view of synchronization accuracy and communication latency.

Figure 7:
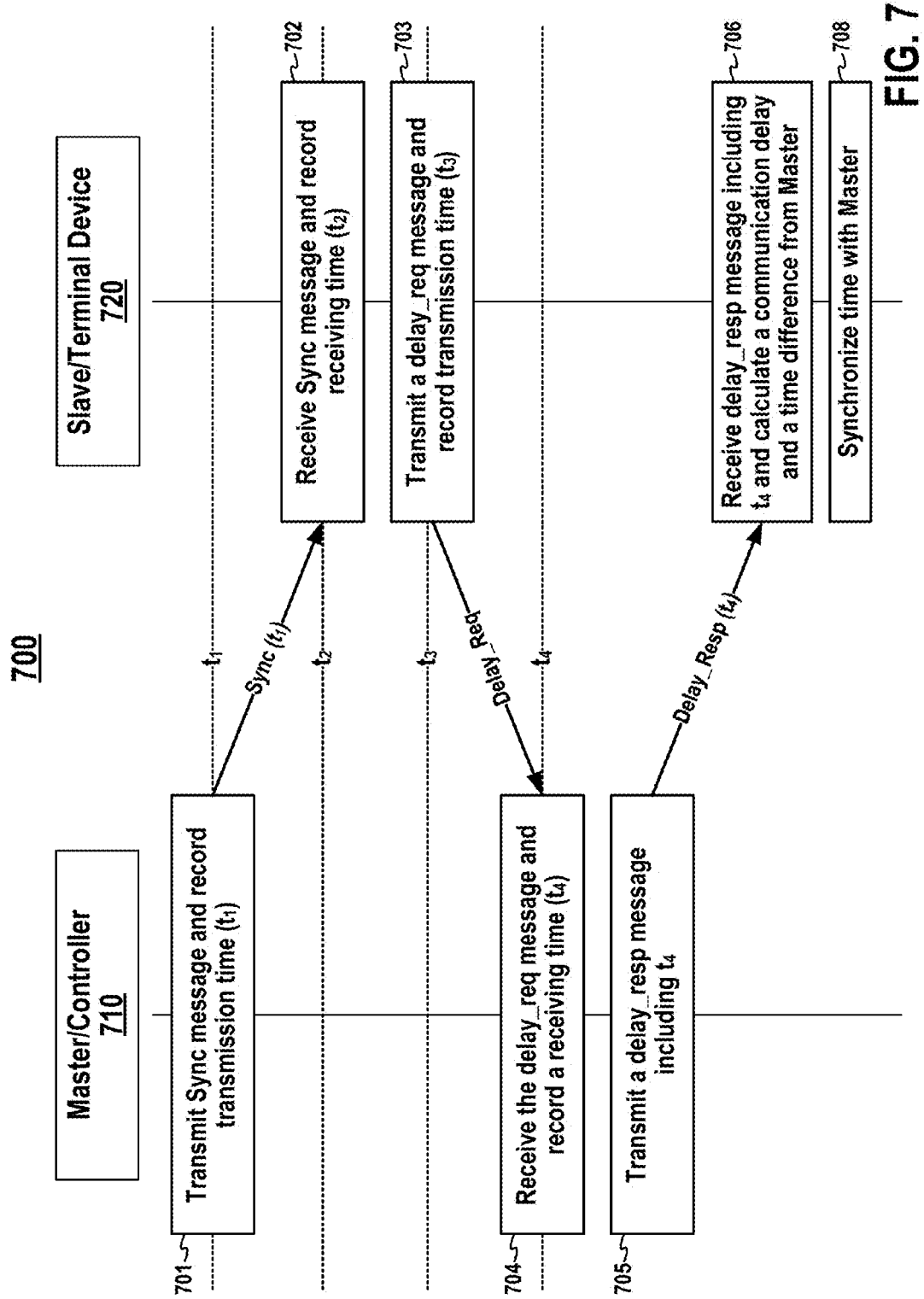
FIG. 7 is a call flow diagram illustrating an example of a latency calculation process associated with resource control in accordance with some aspects of the disclosure.

FIG. 7 is a call flow diagram 700 illustrating an example of a latency calculation process associated with resource control in accordance with some aspects of the disclosure. The call flow diagram 700, in some aspects, corresponds to a component of the resource control 604 of FIG. 6 and, in some aspects, may be consistent with a standard for a precision clock synchronization protocol for networked measurement and control systems (e.g., as set forth in IEEE 1588). In some aspects, the resource control may be based on a designation of a first device (e.g., a terminal device) as a master 710 and a second device (e.g., another terminal device) as a slave 720.

The master 710 may begin the process, at 701, by transmitting, at 701, a first (e.g., Sync) message to a slave and recording a transmission time, $t_1$, of the first message. The slave 720 may, at 702, receive the first message and record a receiving time, $t_2$. The slave 720 may further receive the transmission time, $t_1$, from the master 710. For example, the master 710 may transmit an indication of the transmission time, $t_1$, within the first message or in a subsequent message (e.g., a Follow Up message) associated with the first message.

The slave may then, at 703, transmit a second (e.g., Delay_Req) message and record a transmission time, $t_3$. The master 710 may, at 704, receive the second message and record a receiving time, $t_4$, for the second message. Based on the second message, the master 710 may, at 705, transmit a third (e.g., Delay_Resp) message indicating the receiving time, $t_4$, for the second message. The slave 720 may then, at 706, calculate a communication latency between the master 710 and the slave 720 using the times $t_1$, $t_2$, $t_3$, and $t_4$. For example, an average latency may be calculated by averaging the difference between $t_1$ and $t_2$ and the difference between $t_3$ and $t_4$ (e.g., $t_d=((t_4-t_3)+(t_2-t_1))/2$). In some aspects, the slave 720 may also calculate a time difference (e.g., a timing offset) between a time maintained at the slave 720 (e.g., a local time) and a time maintained at the master 710 (e.g., a system time). For example, a time difference tam may be calculated as $t_{diff}=t_1+t_d-t_2$ if the average latency has already been calculated or as $t_{diff}=((t_1+t_4)-(t_2+t_3))/2$ whether the average latency has been calculated or not. The system time may then be expressed as a local time plus the time difference ($t_{diff}$). The slave 720 may then synchronize a time with the master 710 based on the calculated $t_{diff}$ at 708. For example, referring to FIG. 9, the slave may perform the process shown in FIG. 9 based on a calculated time difference associated with a particular log and/or record. A calculated time difference may be reassessed periodically and be associated with a set of logs and/or records for performing the process shown in FIG. 9 as the local and system times may drift over time. While FIG. 7 illustrates a particular method of calculating a latency time and/or a time difference between a master 710 and a slave 720, the example is not limiting and other methods including peer delay method defined in IEEE 1588 may be used in other aspects or in accordance with other standards.

Figure 8:
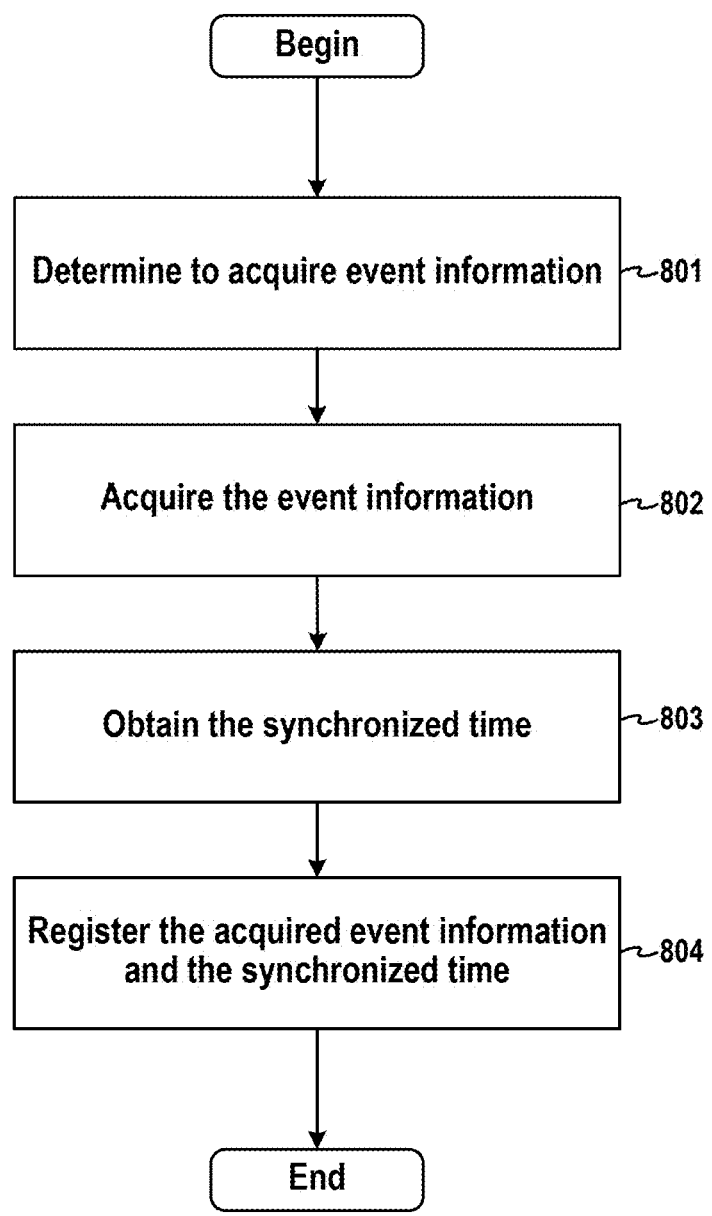
FIG. 8 is a flow diagram illustrating a method of log registration in accordance with some aspects of the disclosure.

FIG. 8 is a flow diagram 800 illustrating a method of log registration in accordance with some aspects of the disclosure. In some aspects, the method may be performed by a terminal device (e.g., a terminal device 123) and/or an I/O control device (e.g., the I/O control device 125). A log registration unit (e.g., a log registration unit 435 of a device 400) may determine, at 801, to acquire event information for logging. The log registration unit may determine to acquire the event information based on a timing configuration of the event logging. In some aspects, the events may be acquired regularly, and/or the acquisition may be triggered by specified events. For example, regular acquisition of event information may include regular acquisition from sensors associated with the log registration unit, and an event-triggered acquisition of event information may include the activation of a processing unit, a CPU, or applications running on the CPU by an interrupt signal triggered by a change of sensor signals.

In some aspects, the log registration unit may determine, at 801, to acquire event information for logging and/or a timing to acquire information for logging an event based on a request from an external device. In case of an incident in the control system, a maintenance to inspect a particular action, and/or a check of the log function, the external device may request to acquire events to the log registration unit 435.

Based on the determination at 801 to acquire the event information, the log registration unit 435 may acquire event information for logging at 802. For example, acquiring the event information may include the acquisition of sensor values. In some aspects, the log registration unit (e.g., log registration unit 435) obtains the synchronized time from a time synchronization unit (e.g., time synchronization unit 431) at 803. The synchronized time (e.g., the system time) may be obtained at 803 based on the method illustrated in call flow diagram 700 of FIG. 7 (e.g., by retrieving a stored value or calculating a current value for the synchronized time). Obtaining the synchronized time at 803, in some aspects, may be performed for each event information acquisition performed by the log registration unit in a set of processes employing the method of flow diagram 800.

Figure 9:
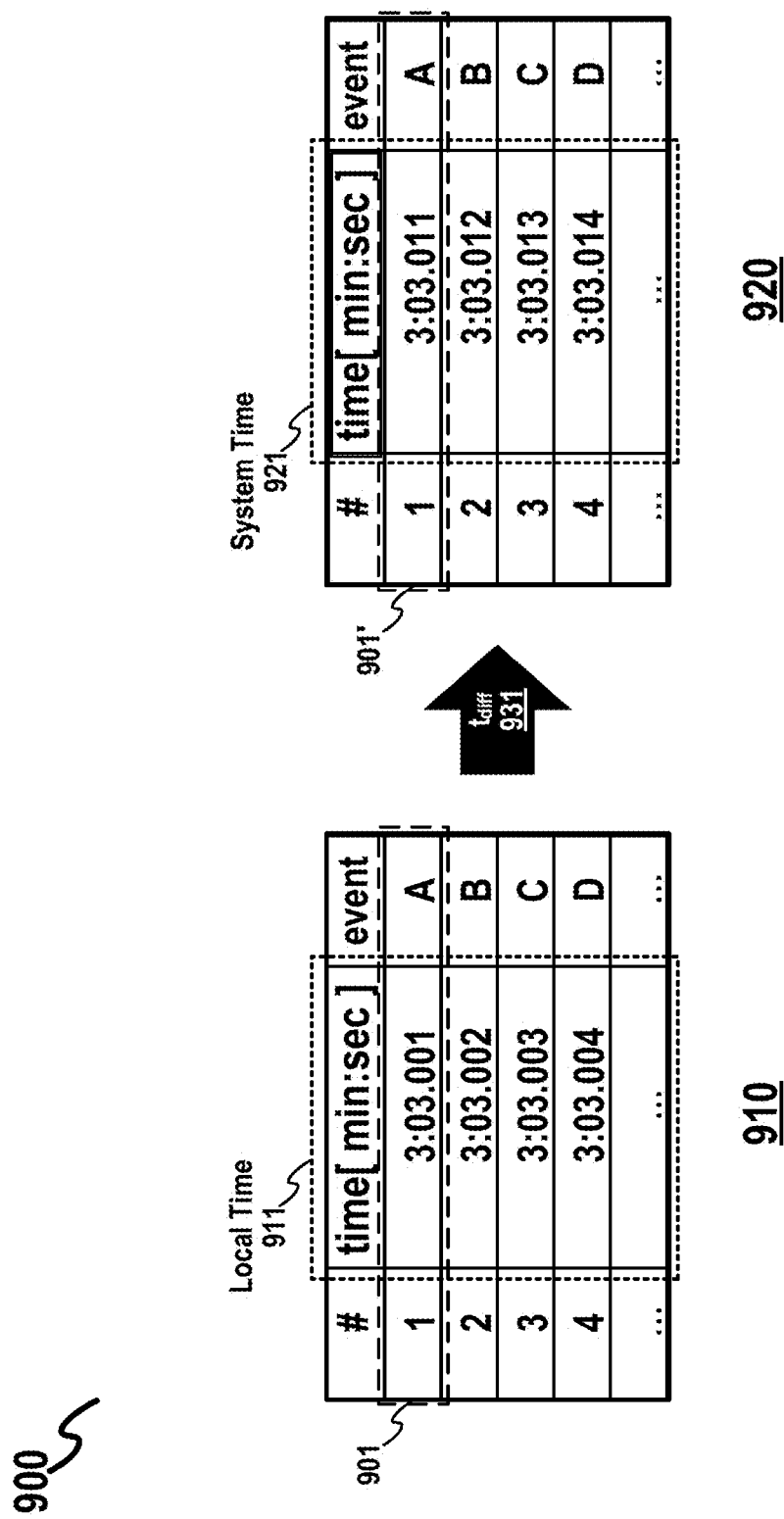
FIG. 9 is a diagram illustrating a first set of logged events associated with a local time and a second set of logged events associated with a system time (e.g., a synchronized time).

Finally, at 804, the log registration unit 435 registers the acquired event information and the synchronized time as a log to a log storage (e.g., log storage 436 of FIG. 4). FIG. 9 is a diagram 900 illustrating a first set of logged events 910 associated with a local time 911 and a second set of logged events 920 associated with a system time 921 (e.g., a synchronized time). For example, a first entry 901 in the set of logged events 910 may be updated based on a time difference 931 between a local time 911 and a system time 921 to produce a first entry 901' in the second set of logged events 920. A time difference 931 between a local time 911 and a system time 921, in some aspects, may be a dynamic value. Accordingly, a local time 911 of a logged event may be updated to a system time 921 at the time of the acquisition of event information with a currently calculated time difference. In some aspects, a time difference 931 between a local time 911 and a system time 921 for an event may be recorded along with the event information, and the local time 911 may be updated to the system time 921 at one of a current time or a later time (e.g., via batch processing).

Figure 10:
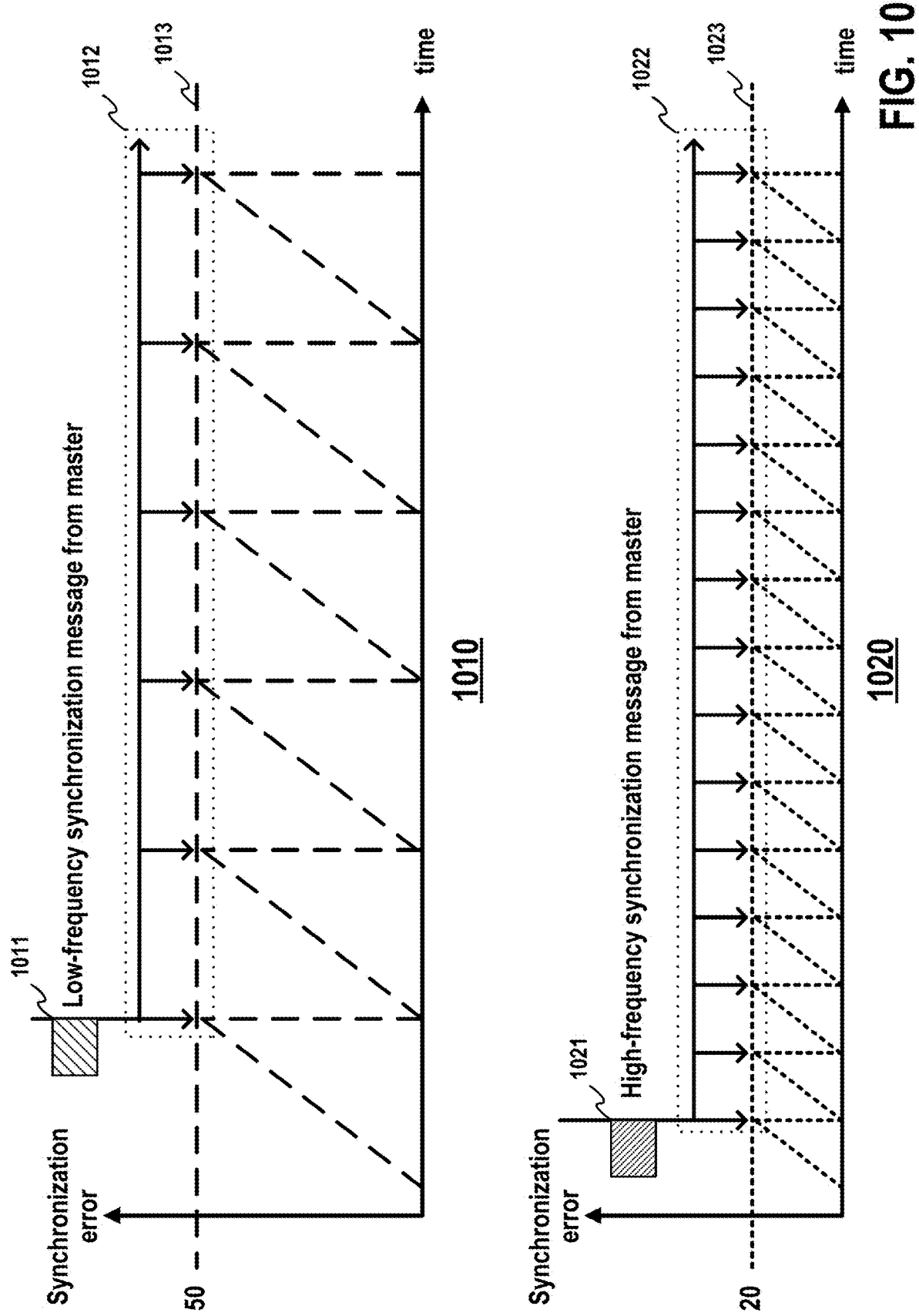
FIG. 10 is a set of diagrams illustrating example relations between (potential) synchronization error as a function of time in relation to the reception of synchronization packets and/or synchronization messages with different frequencies.

In some aspects, synchronization error may be related to a frequency of synchronization packets and/or messages. FIG. 10 is a set of diagrams 1010 and 1020 illustrating example relations between (potential) synchronization error as a function of time in relation to the reception of synchronization packets and/or synchronization messages with different frequencies. For example, diagram 1010 illustrates that for a first set of synchronization messages 1012 (including individual synchronization messages 1011) transmitted from a master (e.g., master 710 of FIG. 7) with a lower frequency, a maximum (potential) synchronization error 1013 may be 50 units, where the units are arbitrary units provided for the sake of illustrating relative differences between a maximum (potential) synchronization error associated with different frequencies of synchronization message transmission. Diagram 1020 illustrates that for a second set of synchronization messages 1022 (including individual synchronization messages 1021) transmitted from a master (e.g., master 710 of FIG. 7) with a higher frequency (e.g., by a factor of 2.5), a maximum (potential) synchronization error 1023 may be 20 units (e.g., reduced by a factor of 2.5).

In describing diagrams 1010 and 1020 reference is made to potential synchronization error to indicate the possibility of a range of synchronization errors between synchronization events (e.g., transmissions in the set of synchronization messages 1012 or 1022). In diagrams 1010 and 1020, the synchronization error over time between synchronization events is illustrated as having a same slope based on an assumption of being associated with a slave (e.g., terminal or I/O control) device, where other devices may have different rates of, or non-linear, synchronization error accumulation. Based on the assumption of a same device and a linear synchronization error accumulation, by increasing the rate of synchronization messages by a particular factor (e.g., in the example of diagrams 1010 and 1020, a factor of 2.5) the maximum synchronization error is reduced by the particular factor. While specific implementations of estimation methods of the synchronized time may also affect the error in some aspects, FIG. 10 conceptually illustrates that, in a particular environment and/or a particular slave device, a higher frequency of synchronization messages improves transmission accuracy (e.g., reduces synchronization error) when compared to a lower frequency of synchronization messages.

Figure 11:
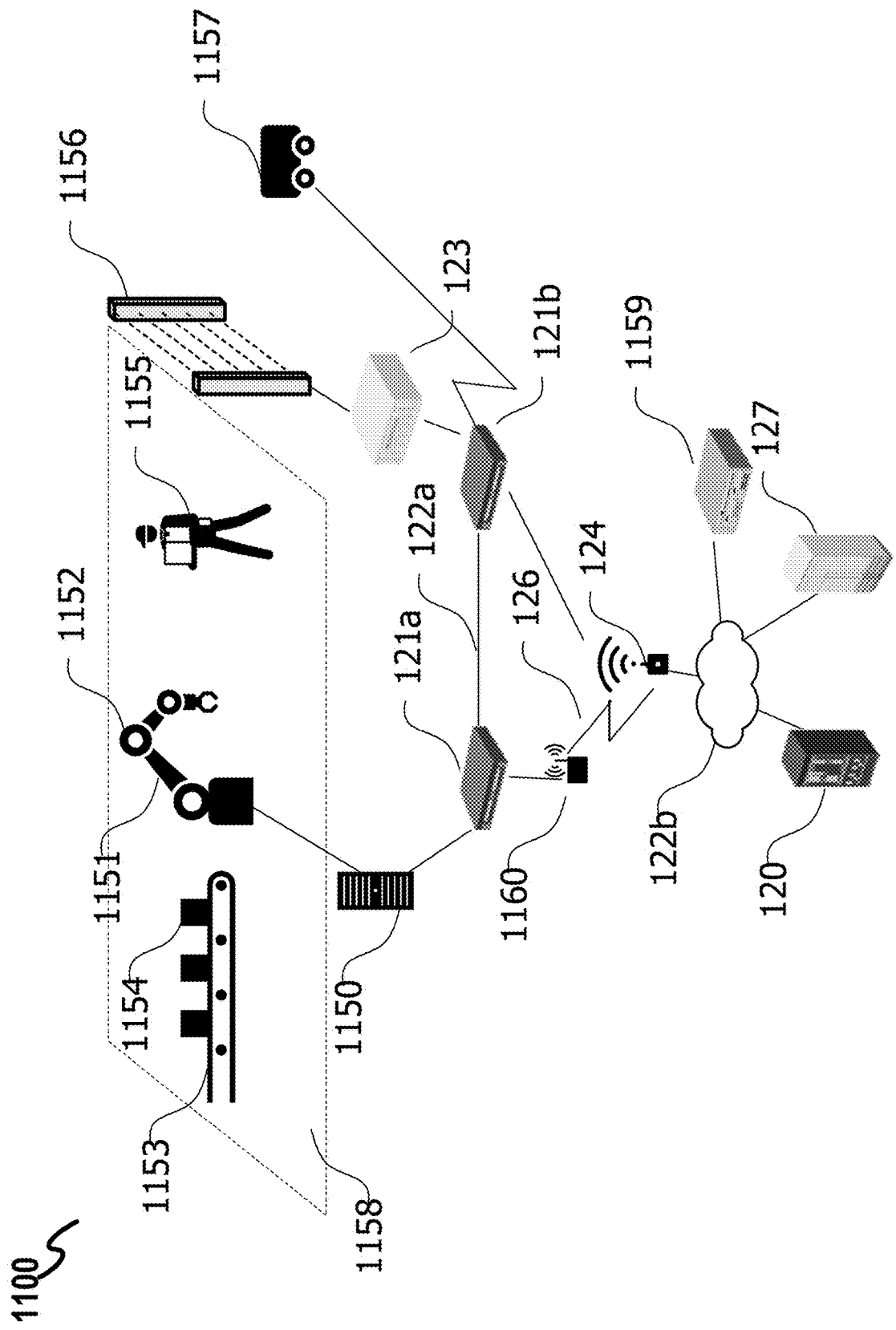
FIG. 11 illustrates a system in an example environment including a collaborative robot, an AGV, and a worker in a factory in accordance with some aspects of the disclosure.

FIG. 11 illustrates a system 1100 in an example environment including a collaborative robot 1151, an AGV 1157, and a worker 1155 in a factory in accordance with some aspects of the disclosure. A system 1100 shown in FIG. 11 is discussed in relation to a process performed by an industrial robot arm 1151 controlled by a robot controller 1150 that picks up parts 1154 going along a belt conveyor 1153 and passes them to a worker 1155 or an AGV 1157. The entrance of the worker 1155 into the collaborative area 1158, in some aspects, may be detected by a curtain sensor 1156. The industrial robot arm 1151, in some aspects, may include a plurality of joint motors 1152. Control implemented by the robot controller 1150 for the joint motors 1152, in some aspects, may allow the industrial robot arm 1151 to implement desired behavior or control the tool center point (TCP). The robot controller 1150, in some aspects, corresponds to the terminal device 123.

The robot controller 1150 and the curtain sensor 1156, in some aspects, may connect with a time synchronization master 1159, the resource control apparatus 120, and the control device 127 via the control network 122a, a UE 1160, the wireless network 126, the wireless base station 124, and the control network 122b. The AGV 1157, in some aspects, communicates with the time synchronization master 1159, the resource control apparatus 120, and the control device 127 via the wireless network 126. The robot controller 1150, the curtain sensor 1156, and the AGV 1157, in some aspects, may be synchronized based on a time synchronization protocol (e.g., a protocol based on IEEE 1588).

The robot controller 1150 and the curtain sensor 1156, in some aspects, may synchronize via wireless and wired communication paths. In such aspects, the UE 1160, the wireless network 126, and/or the wireless base station 124 may be configured to support IEEE 1588. The robot controller 1150, in some aspects, performs control of the industrial robot arm 1151 that may depend on fine time granularity. In some aspects, coarse granularity control commands may be communicated by the control device 127.

The robot controller 1150 and the AGV 1157, in some aspects, may be configured to notify other devices of stored logs. For example, the system may be configured to record logs of control systems and entities accurately, e.g., with fine time granularity, whenever a worker 1155 approaches the industrial robot arm 1151. In some aspects, the fine time granularity may be used to guarantee and/or verify safety of the worker 1155. On the other hand, when a worker 1155 is away from the collaborative area 1158 and an AGV 1157 approaches the industrial robot arm 1151, the system may be configured to record logs of control systems and entities less accurately, e.g., with a coarser time granularity. The coarser granularity used when an AGV 1157 enters the collaborative area 1158 as compared to when the worker 1155 enters the collaborative area 1158, in some aspects, may be based on decreased safety concerns associated with the AGV 1157 when compared to the safety concerns associated with the worker 1155. In some aspects, the system may record logs accurately, e.g., with fine time granularity, for an AGV 1157 entering the collaborative area 1158 based on a decision and/or determination that a collision between the AGV 1157 and the industrial robot arm 1151 is considered a dangerous event, in accordance with an operational policy.

For example, whenever a worker 1155 enters the collaborative area 1158 through the curtain sensor 1156, the resource control apparatus 120 is notified of the detection of the worker 1155 entering the collaborative area 1158 by the curtain sensor 1156 (e.g. corresponding to determining and/or detecting that a triggering event occurs at 601 in FIG. 6). Based on the notification, the resource control apparatus 120 (e.g., the device 500 or the control system state determination unit 540 of the device 500) may determine that the worker 1155 has entered the collaborative area 1158 and is close to the industrial robot arm 1151 (e.g., corresponding to determining the state of the control system at 602 in FIG. 6). Based on the state of the system (e.g., the proximity of the worker 1155 to the robot arm 1151), the resource control apparatus (e.g., control system state determination unit 540 of a resource control apparatus 120) may determine for one or more resource control operations to be performed (e.g., corresponding to determining that the state determined at 602 indicates for a resource control operation to be performed at 603 in FIG. 6). For example, the resource control apparatus may determine to update a logging rate based on the state of the system so that the behavior of the industrial robot arm 1151 is logged and/or recorded with fine time granularity to provide for the safety of the worker 1155.

Based on the determination, the resource control apparatus 120 may then control resources regarding log recording in the robot controller 1150 (e.g., corresponding to performing a resource control operation at 604 in FIG. 6). For example, the resource control apparatus 120 may increase the transmission frequency of Sync messages and/or Follow Up messages transmitted from the time synchronization master 1159 to the robot controller 1150. Increasing the transmission frequency, in some aspects, improves the synchronization accuracy of the robot controller 1150. The resource control apparatus 120 may further decrease a sampling interval (e.g., increase a sampling frequency) of log recording for a log registration unit (e.g., corresponding to the log registration unit 435 to the device 400) in the robot controller 1150. The updated frequency of sync messages and sampling frequency may then be communicated to the time synchronization master 1159 and the robot controller 1150, respectively to configure the different components to record the behavior of the robot controller 1150 with fine time granularity.

The series of sensing, logging, and/or recording events associated with the resource control described above may include a first sensing event from the curtain sensor 1156 associated with the worker 1155 crossing the boundary into the collaborative area 1158, a logging and/or recording event associated with a control command from the robot controller 1150 to joint motor 1152, and an associated sensing event from the joint motor 1152. For example, at a first time, a worker 1155 or an AGV 1157 may be detected passing the curtain sensor 1156 (e.g., a determination is made to acquire event information at 801 in FIG. 8). Based on the detection, a log registration unit of the curtain sensor 1156 may identify an event with the detection of the curtain sensor (e.g., corresponding to acquiring the event information at 802 in FIG. 8). In order to report the event, the log registration unit of the curtain sensor 1156 may obtain the synchronized time (e.g., as described in relation to 803 in FIG. 8) and register the event in the log storage 436 of the curtain sensor 1156 (e.g., as described in relation to 804 in FIG. 8). In some aspects, the log registration unit and the log storage of the curtain sensor 1156 are implemented by the terminal device 123 of the curtain sensor 1156.

In some aspects, control commands to the joint motors 1152 by the robot controller 1150 may be calculated by a processing unit (e.g., corresponding to the processing unit 432 in FIG. 4) in the robot controller 1150. The commands and values associated with the commands are acquired by the log registration unit (e.g., corresponding to acquiring the event information at 802 in FIG. 8 performed for the robot controller) and the processing unit may then output the commands and the values associated with the commands to an output unit (e.g., corresponding to the output unit 434 in FIG. 4). A log registration unit associated with the robot controller may then obtain the synchronized time and register the event based on the synchronized time in a log storage. In some aspects, output of control commands and recording the logs may be performed at regular intervals configured by the resource control apparatus or by default.

Similarly, for sensing in a joint motor 1152, interruption to an input unit by an internal encoder, and/or detection of a worker 1155 or an AGV 1157 by a distance sensor or a human detecting sensor may start the logging process. The log registration unit may acquire the number of notifications from the encoder, the converted result from the number to motor angle, and/or the converted result from the angle to posture or TCP information (e.g. a homogeneous transformation matrix) of the industrial robot arm 1151, with the distance information to the detected object (e.g., state information for the system). The log registration unit may obtain the synchronized time and register the event with the synchronized time in a log storage. In some aspects, recording the logs of the sensing information from the joint motors 1152 may be performed at regular intervals configured by the resource control apparatus or by default.

The distance to a worker 1155, and the velocity and acceleration limit in accordance with the distance are important safety considerations when operating collaborative robots (robots operating in proximity to human workers). Accordingly, the sampling frequency for log recording in the case that a human is close to a collaborative robot is related to the control period (or a control message frequency) that is acceptable for joint motors of the collaborative robot. The sampling period may be configured to enable observation (e.g., by the control system) of a transient response of the joint motors 1152 and to verify the safety for a worker 1155. In order to achieve this, the industrial robot arm 1151 and/or the collaborative area 1158, in some aspects, may be equipped with a sensing function to measure the distance between the industrial robot arm 1151 and a worker 1155. Such sensors, in some aspects, may include a distance sensor associated with the industrial robot arm 1151, an image analysis system with cameras associated with the collaborative area 1158 as sensors, or any other set of sensors that can monitor a location of (and a distance between) different objects in the collaborative area 1158.

In some aspects, the time synchronization master 1159 may execute applications communicating with the resource control apparatus 120 to allow the resource control apparatus 120 to control the communication resources. The time synchronization master 1159 may change the transmission frequency of Sync messages and/or Follow Up messages in accordance with an instruction (based on a resource control operation) to change the transmission frequency from the resource control apparatus 120. The instruction may include an indication to change the transmission frequency, and the new transmission frequency to use. In some aspects, the instruction may indicate one of increasing or decreasing the frequency, and the time synchronization master 1159 may determine the actual frequency.

In some aspects, the resource control apparatus 120 may indicate, in the instruction, a difference from the current frequency. For example, the indication may be based on a multiplicative factor (0.5 or 2) applied to a frequency or a period or an additive factor (+1 Hz to go from 4 Hz to 5 Hz).

In the example discussed above, a worker 1155 is assumed to perform handing a part 1154 to and/or from the industrial robot arm 1151 and getting out from the collaborative area 1158. As described above, in some aspects, the exiting is detected by the curtain sensor 1156 (601 in FIG. 6), then the control system state determination unit 540 determines the state of the collaborative area 1158 (602 in FIG. 6). The control system state determination unit 540 determines no risk is present because a worker 1155 is out of the collaborative area 1158, so that the control system state determination unit 540 may release resources (e.g., sensing and/or communication resources) associated with the enhanced resource allocation that was based on the proximity of the human worker to the robot arm 1151 now that the state associated with the enhanced resource allocation is no longer the state of the system. Specifically, the transmission interval (e.g., the periodicity) of the Sync messages and/or Follow Up messages may be configured to be longer (e.g., may be configured to be transmitted with a lower frequency) to save the communication resources. Other examples are the sampling period and/or the recording interval to the log storage 436 are set longer to reduce computing load of the processing unit 432 and the log registration unit 435, and the used storage capacity of the log storage 436. In some aspects, allocated resources may not be released if there are adequate resources available to the system to maintain the enhanced resource allocation.

If, at a second time after the worker 1155 has left the collaborative area 1158 and an AGV 1157 enters the collaborative area 1158 through the curtain sensor 1156, the control system state determination unit of a resource control apparatus 120 may determine the state of the collaborative area 1158, in accordance with an operational policy. The resource control apparatus, in some aspects, may reduce an allocation of resources, may not change an allocation of resources, or may prohibit allocating enhanced resources (e.g., a large amount of resources) based on a determination that a risk for a danger to a human is considered to be low. In some aspects, the resource control apparatus may increase the resource allocation in order to prevent, or make less likely, a collision between machines. The amount of resources (synchronization and/or reporting resources) allocated in order to prevent the collision between the machines may, in some aspects, be less than an amount of resources allocated when a worker is in the collaborative are 1158, but may be greater than an amount of resources allocated when neither an AGV nor a human is in the collaborative area 1158.

Generally, a set of configured events may be associated with different levels of danger and/or risk and may be associated with a corresponding set of resource allocation configurations. The system may use a pre-defined set of danger levels associated with different possible dangers. For example, a first, lowest level of danger and a corresponding low-granularity resource allocation (e.g., a minimal resource allocation) may be associated with a low risk of damage to property. One or more intermediate levels of danger and one or more corresponding intermediate granularity resource allocations (e.g., intermediate resource allocations) may be associated with one or more intermediate levels of risk to property and/or one or more low or intermediate risks to a human worker. Finally, a highest level of danger and a corresponding highest granularity resource allocation (e.g., a most resource intensive allocation) may be associated with a high risk to valuable property and/or a human worker.

In some aspects, a risk of collision or contact between machines (or a machine and a wall or other structure) may be associated with one of a low granularity or intermediate granularity resource allocation based on a risk level calculated based on the state of the system (e.g., a distance between the machines, a velocity of the machines, an acceleration of the machines, or other relevant parameters). A risk of collision between a machine and a human may be associated with an intermediate granularity or high(est) granularity resource allocation based on a separate risk calculation based on the state of the system (e.g., the location (in, or out of, an area) of the human, a distance to a machine, a reach of an industrial robot arm, velocities and accelerations of the human or any surrounding machines, or other relevant factors). Factors for a risk calculation based on distance and/or location may include, whether a human is within a threshold distance, whether two autonomous vehicles (e.g., AGVs) are within a threshold distance, whether a human and/or machine is within a particular area (e.g., a prohibited area, or a particularly dangerous area), and whether a human or machine is in a position that is different from an expected location by a threshold distance. As discussed throughout, the state (e.g., location velocity, acceleration, and so on) of the different components of the system may be measured by sensors installed (or worn by a worker) for monitoring the different aspects of the system state that have been determined to be useful for determining the state of the system and whether it is functioning properly.

An example of the logged events includes internal action in the AGV 1157. The internal actions may include output of control commands to steer the body of the AGV 1157 and/or actuate the tires. Logged events associated with the AGV 1157 may include sensing values from associated motors, sensing values from a weight sensor associated with the AGV 1157 when the AGV 1157 receives a part 1154, and/or a sensing value from a contact sensor, associated with the AGV 1157, to detect a collision. Once the AGV 1157 hands a part 1154 to, or receives a part 1154 from, the industrial robot arm 1151 and gets out from the collaborative area 1158, the curtain sensor 1156 detects the leaving and may execute the process shown in FIG. 6 again to reallocate resources. In some aspects, the worker 1155 may be detected by sensors associated with the industrial robot arm 1151 and/or the collaborative area 1158 in addition to, or in the absence of, the curtain sensor 1156.

In some aspects, regular times to record a log event such as a sensor value may be synchronized between a plurality of terminal devices 123 and/or I/O control devices 125 to compare a plurality of the sensor values easily. For example, in some aspects, the start time may be synchronized such that, if the sampling period is 1 ms and a start time is at 100 ms, the times to record a log in a plurality of the terminal devices 123 may be 100 ms, 101 ms, 102 ms, and so on. When a part of the terminal devices 123 and/or I/O control devices 125 has a time difference that is lower than, or offset from, the sampling period such as 100.5 ms, 101.5 ms, 102.5 ms, and so on, it may be difficult to compare the sensor value with the logs in the other terminal devices 123. In some aspects, the times to record logs may be shared among the terminal devices 123 and/or I/O control devices 125, and the terminal devices 123 and/or I/O control devices 125 may adjust the times to record logs to align with the others.

Figure 12:
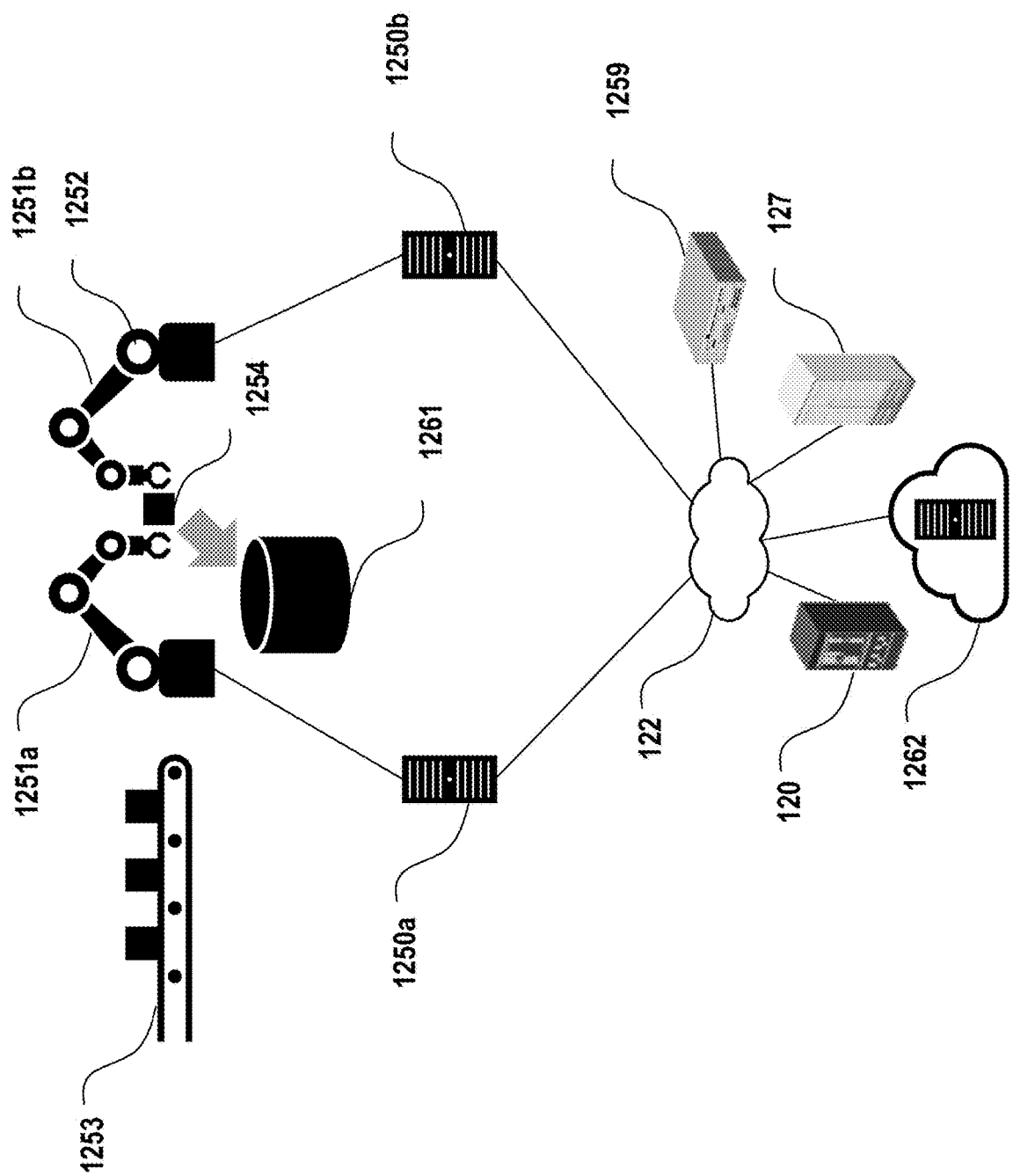
FIG. 12 illustrates a system for carrying a part from a belt conveyor to a table by a collaboration between a two industrial robot arms.

FIG. 12 illustrates a system for carrying a part 1254 from a belt conveyor 1253 to a table 1261 by a collaboration between a two industrial robot arms 1251*a* and 1251*b*. While FIG. 12 illustrates one example of collaboration between a pair of industrial robot arms, the concepts discussed in relation to FIG. 12 may be applied to other control systems with other types, or numbers of, devices and/or humans working together to accomplish a task. For example, another application may be to a case in which a first industrial robot arm holds a metal plate and a second industrial robot arm cuts the metal plate with a cutting device associated with the tip of the second industrial robot arm. As described, the machine may not be limited to an industrial robot arm, but may also be an AGV and/or other machine as may be applicable. In some aspects, the robot controller 1250*a* and/or 1250*b* of the industrial robot arm 1251*a* and/or 1251*b* may be connected with other apparatus via wireless network 126 while the robot controller 1250*a* and/or 1250*b* is connected via the control network 122 in FIG. 12.

In some aspects, the time synchronization master 1259 may execute applications communicating with the resource control apparatus 120 to allow the resource control apparatus 120 to control the communication resources. The time synchronization master 1259 may change the transmission frequency of Sync messages and/or Follow Up messages in accordance with an instruction (based on a resource control operation) to change the transmission frequency from the resource control apparatus 120. The instruction may include an indication to change the transmission frequency, and the new transmission frequency to use. In some aspects, the instruction may indicate one of increasing or decreasing the frequency, and the time synchronization master 1259 may determine the actual frequency.

Figure 13:
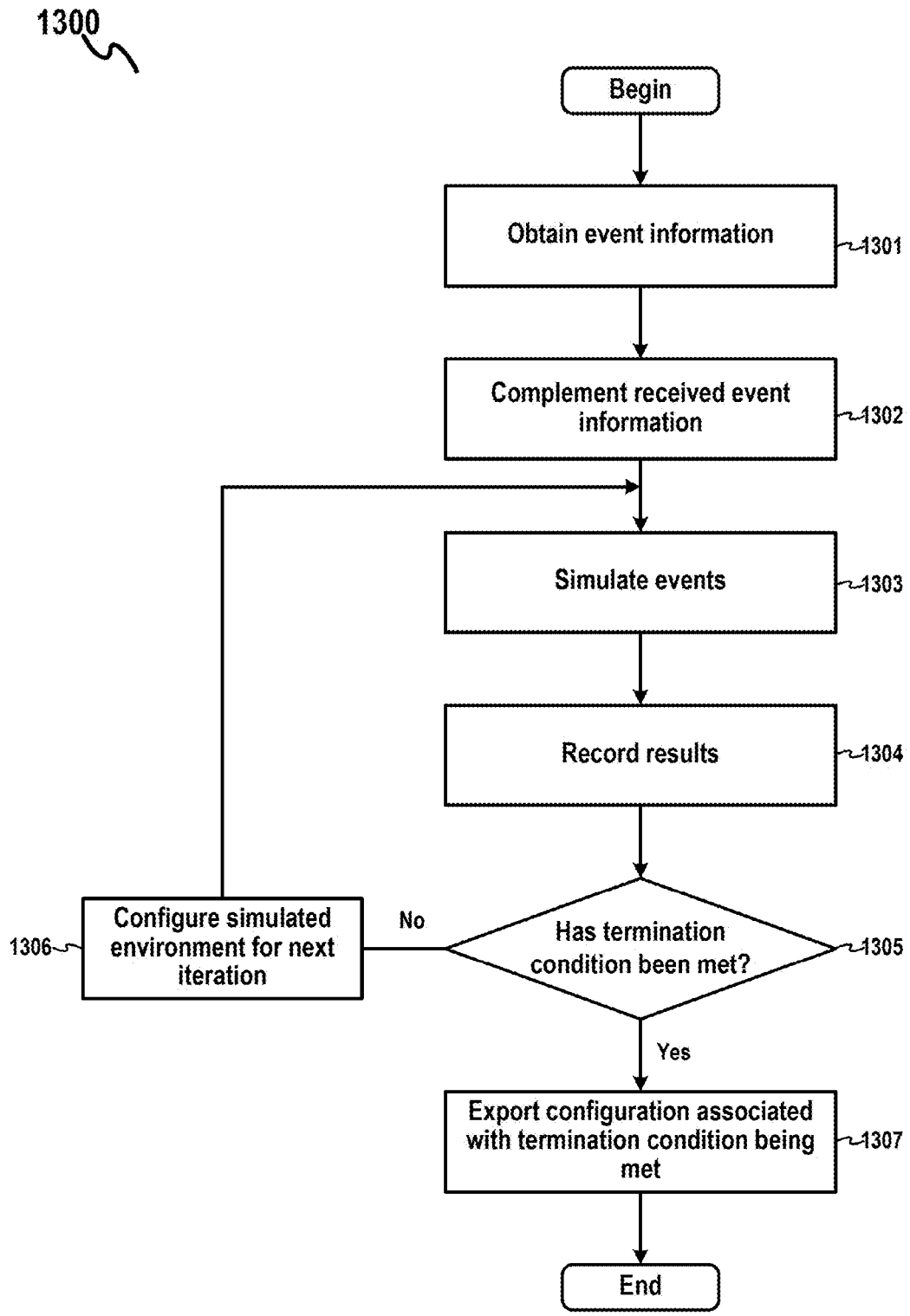
FIG. 13 is a flow diagram illustrating a method for a cause analysis associated with for failures of a system.

FIG. 13 is a flow diagram 1300 illustrating a method for a cause analysis associated with for failures of a system. Flow diagram 1300 will be described below in relation to a failure in a system depicted in FIG. 12 or similar systems including collaboration and/or cooperation between machines controlled in the system to achieve a desired result. Accordingly, FIG. 13 assumes that a desired behavior is not achieved, i.e., there is a failure of the system, due to problems of a control algorithm and/or control programs in the system shown in FIG. 12. For example, the failure may relate to the industrial robot arm 1251*a* failing to pick a part 1254 up from the belt conveyor 1253, or one of the industrial robot arms 1251*a* and/or 125 lb dropping a part 1254 on the way to the table 1261. Another example with respect to a case of cutting a metal plate is that a cutting line differs from the desired line, or a processing accuracy is insufficient.

In some aspects, the method is performed by an analysis apparatus 1262 that performs various analyses, modification of control algorithm and/or applications, simulation, and/or emulation based on logged events. The hardware structure of the analysis apparatus 1262, in some aspects, may correspond to the structure of the device 200 of FIG. 2, the device 300 of FIG. 3, or the computing device 2005 of FIG. 20. The analysis apparatus 1262, in some aspects, may be implemented as a simulator, an emulator, or an analysis tool.

Logs of the failure event analyzed using the method illustrated in flow diagram 1300 may be recorded by robot controller 1250*a* and the robot controller 1250*b*. The recording of logs related to the failure event may be similar to log recording discussed in relation to FIGS. 6, 8, and 11 above. For example, a log registration unit may records events on log storages in the robot controllers 1250*a* and the robot controller 1250*b*.

At 1301, the analysis apparatus may obtain the information related to the failure event (e.g., the information recorded by the robot controllers 1250*a* and/or 1250*b* and stored on log storages). The information may be obtained at 1301 from a log acquisition unit that may acquire the stored information and send the information to the analysis apparatus 1262 via a communication unit. The information obtained at 1301, in some aspects, may include control information and sensor information as discussed above in relation to FIGS. 8 and 11.

At 1302, the analysis apparatus 1262 may complement the information received at 1301 to provide the analysis. The complementation at 1302, in some aspects, may include preparation of simulation models of entities (e.g., the industrial robot arms 1251*a* and 1251*b* and/or the robot controllers 1250*a* and/or 1250*b*) forming the control system, and/or preparation of the used control logics and/or the application logics. The simulation models may be geometric models of the industrial robot arm 1251*a* and/or 1251*b*, the belt conveyor 1253, the part 1254, the table 1261 in 3D simulation, and/or simulating a physical law such as gravity when a part 1254 falls down.

In some aspects, the simulation models may include a network simulation model to simulate communications among the robot controller 1250, the resource control apparatus 120, and/or the analysis apparatus 1262 via the control network 122. The time granularity of the simulation models may vary in accordance with the purpose of the analysis. For example, a model of a joint motor 1252 with fine time granularity may be used, and/or a discrete-event simulation model to simulate packet communications may be used. In some aspects, a control application logic of a joint motor 1252 operating on the robot controller 1250*b* may be provided as an execution model of a simulator, or may be converted to an execution model of a simulator. A time synchronization software operating on the resource control apparatus 120 and the robot controller 1150 may similarly be modeled at the same.

At 1303, the analysis apparatus 1262 may reproduce the stored events through a simulation or an emulation from the collected information and complemented information generated at 1302. For example, based on the models of the components of the system and the control logic may be used to simulate and/or emulate the failure event. The reproduced results (e.g., the results of the simulation) may be recorded to improve a control algorithm, to visualize the results of the simulation for user review, or if needed for other reasons, at 1304.

In some aspects, the simulated events are recorded at 1304 with the time in the simulator. For example, when the control logic in the robot controller 1150 is updated to configure the simulated environment for a next iteration as will be discussed below in relation to 1306, outputs of the control commands from the robot controller 1150 to the joint motors 1152 and times of the outputs may be recorded. In some aspects, a sensor value in the simulation may be also recorded with the time in the simulation. The sensor value may correspond to the reaction of the environment to the updated control actuation of the robot controller 1150. The recorded sensor value may be used for the improving the accuracy of the environment model. The time in the simulation may be the unified time in the simulation or the simulated time based on the simulated time synchronization among the entities (e.g., the industrial robot arm 1251a, the industrial robot arm 1251b, and the resource control apparatus 120) that may include the simulated time error.

At 1305, the analysis apparatus 1262 may determine whether a termination condition has been met. The termination condition may be formulated based on the purpose of the analysis. For example, if the purpose is observation, the termination condition may be that a fixed number of iterations has been performed while, if the purpose is solving a detected failure the termination condition may be having a simulation that does not experience the failure.

If the termination condition is not satisfied at 1305, the analysis apparatus 1262 may configure, at 1306, the simulated environment for a next iteration of the simulation and/or emulation. Configuring the simulated environment at 1306, in some aspects, may include updating control logics and/or the simulated/emulated environment. The configuration at 1306, in some aspects, may include an improvement process when the target control system does not satisfy the desired behavior, function, and/or performance.

For an industrial robot arm 1251a and an industrial robot arm 1251b that drop a part 1254, multiple considerations and/or measurements may be considered for updating at 1306. For example, the update may configure an updated location of the table 1261 to get close to the industrial robot arms 1251. In some aspects, the update may modify the control logic of the robot controller 1250a and/or the robot controller 1250b. The time synchronization method among the industrial robot arm 1251a and the industrial robot arm 1251b, in some aspects, may be updated at 1306 to improve the synchronization accuracy among the industrial robot arm 1251a and the industrial robot arm 1251b and the cooperation performance.

After configuring the simulated environment for the next iteration, the analysis apparatus 1262 may perform the simulation at 1303 to produce an updated set of results that are recorded at 1304. Based on the updated set of results, the analysis apparatus 1262 may again determine at 1305 whether the updated set of results meet the termination condition. For example, if the detected failure associated with the method illustrated in flow diagram 1300 is the industrial robot arm 1251a and the industrial robot arm 1251b dropping a part 1154, the termination condition may be associated with the industrial robot arm 1251a and the industrial robot arm 1251b succeeding in placing the part 1154 on the table 1261, or an error between a placed position of the part 1154 and the goal position marked on the table 1261 is less than a threshold.

If the analysis apparatus 1262 determines that the termination condition has been met, the analysis apparatus 1262 may export the configuration associated with the termination condition having been met at 1305 (e.g., the last configuration used to update the simulation at 1306) and the process may end. At 1307, the analysis apparatus 1262 exports the configuration in order to update the components of the control system of FIG. 12 with a configuration that does not fail during a simulation at 1303. Additionally, or alternatively, the configuration may be exported for the control system to test the updated configuration in the physical environment to provide feedback regarding the accuracy of the simulation and/or a need to further refine the configuration for operation of the physical environment as will be discussed in relation to FIG. 14 below.

In some aspects, the analysis apparatus 1262, at 1307, may select information to deliver to a terminal device among the recorded information at 1304. Control commands may be selected, in some aspects, because the process focuses on evaluating the effect of the control logic in the simulation. However, sensor values in the simulation may be omitted because the sensor value may not be replayed in actual environment, e.g., the sensor values that result from the implementation of the updated control logic may not be the same as in the simulated environment and may provide feedback as to the accuracy of the simulation and/or the efficacy of the updated configuration.

In some aspects, the analysis apparatus 1262 may export, at 1307, the selected information to each of a set of terminal devices that are associated with the updated configuration (e.g., control commands). Because a plurality of the terminal devices may be related to the updated configuration, the analysis apparatus 1262, in some aspects, may identify subsets of the configuration that are associated with each terminal device and provide each terminal device with the subset of the configuration corresponding to that terminal device. For example, referring to FIG. 12, the updated configuration (e.g., the simulation results) associated with the industrial robot arm 1251a are sent to the industrial robot arm 1251a, and the updated configuration (e.g., the simulation results) associated with the industrial robot arm 1251b are sent to the industrial robot arm 1251b. The control commands associated with the updated configuration may further be adjusted by the analysis apparatus 1262 to reflect a future time at which to execute the control commands at the terminal device(s) or may be associated with a time offset value used by the terminal device(s) to determine when to execute the control commands provided by the analysis apparatus 1262.

In some aspects, the method illustrated in flow diagram 1300 may be conceptualized as applying a digital twin that simulates and optimizes the behavior of the control system shown in FIG. 12 in a cyber space of the analysis apparatus 1262 (e.g., implemented as a cloud). Therefore, the optimization of the control system applying IoT can be achieved. In some aspects, the simulation model or a digital twin generated by the stored information may be combined with other models, or may be reproduced or analyzed through deploying the model or the twin in a virtual space such as a metaverse.

Using the method illustrated in flow diagram 1300, a specific control algorithm based on behaviors of overall entities in a control system may be validated. For example, a dispatching algorithm (e.g., an algorithm dispatching surplus AGVs to a vacant area) for a fleet of AGVs may be validated. Similarly, dispatching algorithms of taxies including autonomous driving vehicles may be validated using the method of flow diagram 1300.

Additionally, as a result of the analysis, the analysis apparatus 1262 may warn an operator of inconsistency based on integrating multiple sensor results. For example, a camera sensor monitoring an area records an AGV entering an area while the AGV itself does not record the entering into the area, leading to inconsistency. Provided that image analysis is applied to the detection by the camera sensor. In this case, fatal time synchronization error between the camera sensor and the AGV, failure of the camera sensor and/or the AGV, and/or a fault in the image analysis of the camera sensor are suspected. An operator may investigate the cause based on the warning, and can improve the stability of the control system by taking appropriate measures. Integrating multiple sensor results, in some aspects, may not be limited to camera sensors, and may include integrating one or more of a set of infrared sensors, RADAR, LiDAR, or other sensors in a similar manner to detect the presence of an entity or passing of an entity. In some aspects, if multiple sensors sense the same event, a majority decision may be applicable to detect failed sensors. Accordingly, a more accurate assessment and/or identification of working and/or failed sensors may be provided. For example, if a camera sensor, a curtain sensor, and an AGV equipped with a location sensor monitor the AGV entering into an area, the sensor associated with the AGV may be presented as failed if only the sensor of the AGV differs from the others.

Figure 14:
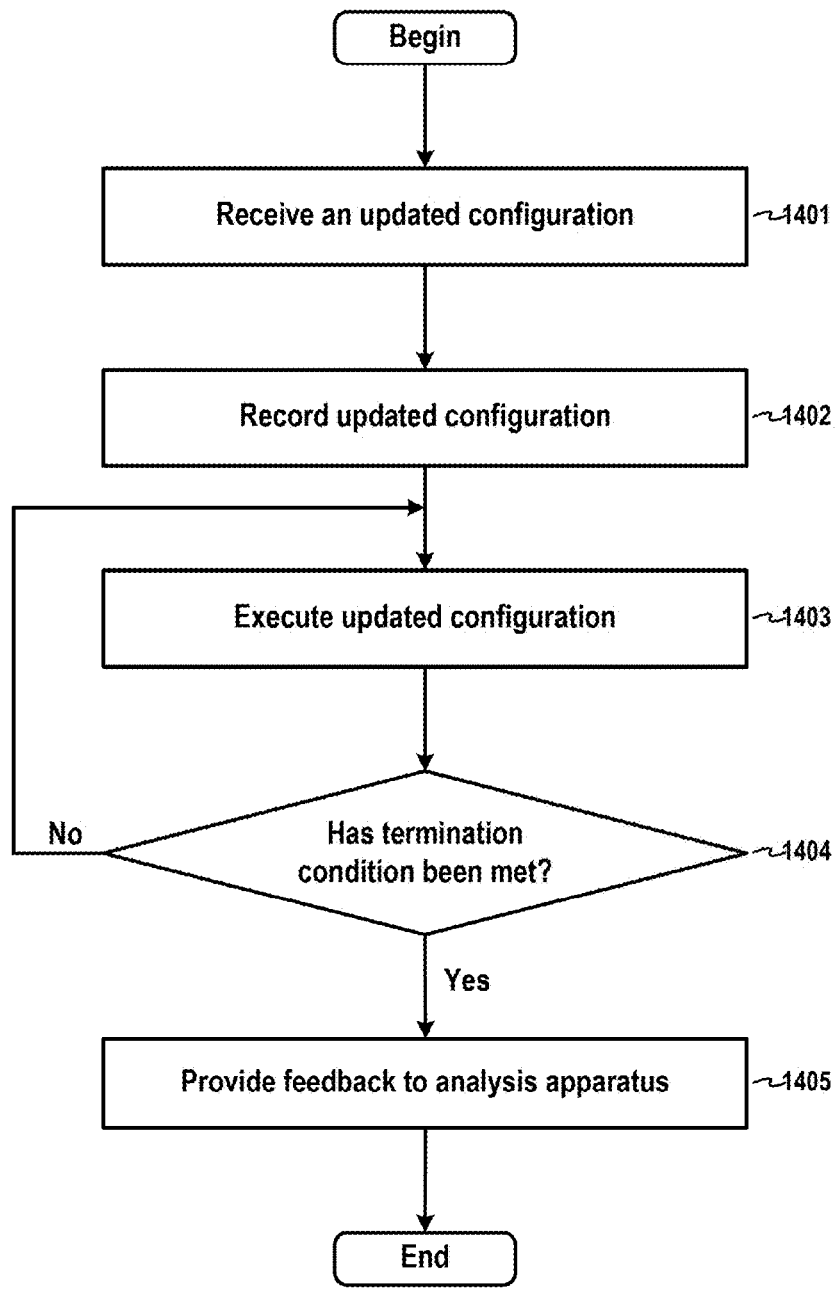
FIG. 14 is a flow diagram of a method of implementing an updated configuration determined for a simulated device (or environment) as described in relation to FIG. 13 for a physical device (or environment).

FIG. 14 is a flow diagram 1400 of a method of implementing ("replaying") an updated configuration determined for a simulated device (or environment) as described in relation to FIG. 13 for a physical device (or environment). The method of FIG. 14 may be performed by each terminal device or components associated with each terminal device that receives the updated configuration exported by the analysis apparatus 1262 at 1307 of FIG. 13. At 1401, the terminal device (or a log registration unit of the terminal device) receives the updated configuration from the analysis apparatus (e.g., the updated configuration exported at 1307 of FIG. 13). As discussed above, the updated configuration received by the terminal device at 1401 may include a set of control commands relevant to the terminal device based on a simulation. The control commands may be received at the terminal device to implement to test the accuracy of the simulation and/or the efficacy of the solution provided by the simulation.

At 1402, the terminal device (or a log registration unit of the terminal device) records (e.g., on a log storage of the terminal device) the updated configuration received from the analysis apparatus (e.g., via a communication unit). Recording the updated configuration, in some aspects, may include modifying a time associated with the updated configuration because the recorded time in the simulation is a time in the past (e.g., the time of the recorded failure event). Accordingly, the modification, in some aspects, may be an addition of a specified time period to have the terminal device(s) execute the updated configuration (e.g., control commands) in the future. The specified time period, in some aspects, may be a known time period provided by an operator such as one hour or 45 minutes (based on an assumption that the method of FIG. 13 will be complete and the updated configuration exported in a shorter amount of time such as 40 minutes or 30 minutes). In some aspects, the specified time period may be a calculable time period such as a time period that will schedule updated control commands a specified number (e.g., four or five) minutes after an updated configuration is received. As discussed above, in some aspects, the analysis apparatus may provide a time offset to be used by each terminal device.

Figure 15:
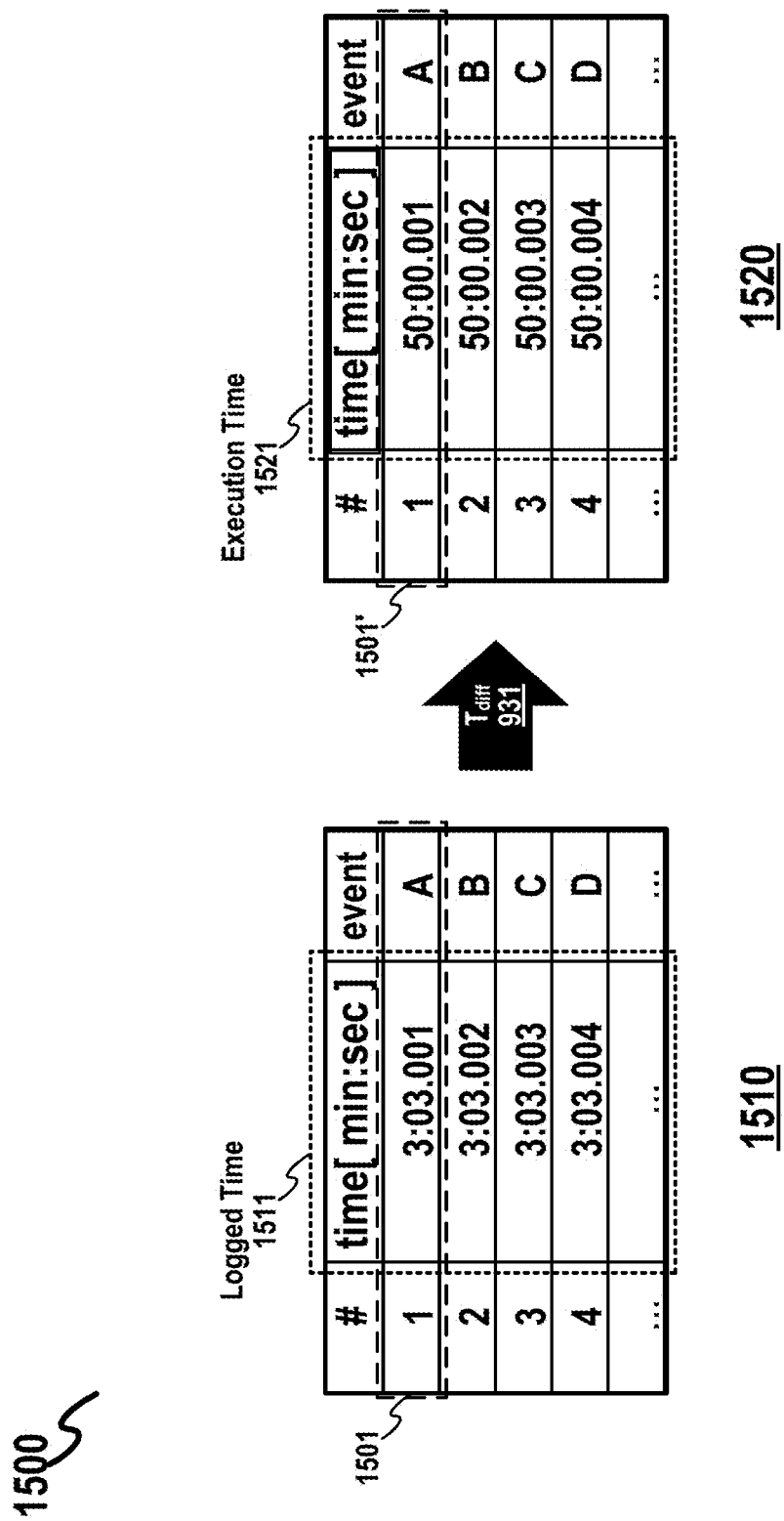
FIG. 15 illustrates an example of a time modification that may be performed as part of recording the updated configuration at in accordance with some aspects of the disclosure.

FIG. 15 is a diagram 500 illustrates an example of a time modification that may be performed as part of recording the updated configuration at 1402 in accordance with some aspects of the disclosure. The time of a first event (e.g., a logged time 1511) and/or control command (e.g., #1) received from the analysis apparatus at 1401 associated with the industrial robot arm 1251a is originally 3:03.001 in a received log entry 1501 of diagram 1510, and the execution time 1521 is shifted to 50:00.001 to pass a delivered time 45:00 in an updated log entry 1501' of diagram 1520. The same difference (e.g., 46:57) between 50:00.001 and 3:03.001 is added to the other logs to maintain the relative timing of each entry. In some aspects, the modification may maintain digits lower than a specified digit (e.g. digits that are less than a second), and may set a future time that is after the current time to digits larger than a specified digit (e.g. seconds). In some aspects, the numbers lower than a specified digit may be ignored. For example, if an actuator executing the control commands in the updated logs operates in microseconds while the time is recorded in nanoseconds, the digits corresponding to nanoseconds (e.g., anything less than a microsecond) may be floored (i.e., the numbers associated with time increments less than a microsecond may be set to 0). The time modification may be performed by one or more of the analysis apparatus 1262, the log registration unit 435, and/or the log acquisition unit 437. For example, the analysis apparatus 1262 may adjust the time in the recording step at 1304. The log registration unit 435 may adjust the time when the log registration unit 435 registers an event in the log storage 436. The log acquisition unit 437 may adjust the time when the log acquisition unit 437 extracts a log from the log storage 436. In some aspects, an operator may notify one or more of the analysis apparatus 1262, the log registration unit 435, and/or the log acquisition unit 437 of any or both of the time period to be added and the adjusted time of the first log.

The terminal device, at 1403, determines that the log time has arrived and executes the updated configuration. Executing the updated configuration at 1403, in some aspects, may include extracting a log from a log storage and then executing the event in the extracted log. The execution of the updated configuration (e.g., the control command) may be based on a synchronized (or system) time such that multiple different terminal devices or other components of the control system execute commands based on a shared time reference. (e.g. the industrial robot arm 1251a and the industrial robot arm 1251b in FIG. 13) can be replayed. During the execution of the control commands at 1403, the terminal device (or sensors of the terminal device), other devices, and/or or other sensors may collect and/or record information related to the execution of the updated configuration (e.g., the control commands) received from the analysis apparatus.

After executing the updated configuration, the terminal device, at 1404, determines whether a termination condition has been met. In some aspects, determining whether the termination condition has been met at 1404 may include determining if there are any log entries that have not yet been executed (e.g., log entries for a future time received from the analysis apparatus) and/or whether an instruction has been received from an operator to terminate the execution of unexecuted log entries. If the terminal device determines that the termination condition has not been met at 1404, the terminal device returns to 1403 to execute a next log entry at a time specified in the next log entry.

If the terminal device determines that the termination condition has been met at 1404, the collected and/or recorded information may be provided to the analysis apparatus as feedback at 1405 and the method ends. The analysis apparatus may then use the collected and/or recorded information to update the simulation model associated with the control system (e.g., one of the systems illustrated of FIG. 1, 11 or 12) used to generate the updated configuration associated with the updated configuration and the feedback to improve the performance of future simulations. It will be understood that if a failure event is detected or occurs during the course of the method illustrated in flow diagram 1400, it may trigger an additional performance of the methods of FIGS. 13 and 14.

In some aspects, the method of FIGS. 13 and 14 are performed in parallel. For example, a terminal device may execute logs (e.g., control commands) associated with an analysis of a first event while an analysis apparatus analyzes a second event. Parallel execution of the optimization process (e.g., the method of FIG. 13) in the analysis apparatus 1262 and the replaying (e.g., the method of FIG. 14) in the terminal device enables real-time improvement of the control system operation during operation.

During the execution of the control commands at 1403, the terminal device (or sensors of the terminal device), other devices, and/or or other sensors may collect and/or record information related to the execution of the updated configuration (e.g., the control commands) received from the analysis apparatus. The collected and/or recorded information may be provided to the analysis apparatus as feedback at 1405. The analysis apparatus may then use the collected and/or recorded information to update the simulation model associated with the control system (e.g., one of the systems illustrated of FIG. 1, 11 or 12) used to generate the updated configuration associated with the updated configuration and the feedback to improve the performance of future simulations.

Additional aspects of the system are described below that may apply to any of the systems illustrated in FIGS. 1, 11, and 12. In some aspects, an analysis of transient responses of joint motors may be desired for a case that a robot controller activates the industrial robot arm from a stopped state to grasp a part on the belt conveyor. The industrial robot arm may have a speed limit and/or acceleration limit imposed on a TCP in accordance with an attribute of the part being handled. For example, when the industrial robot arm conveys a glass with water, a grasping point on the glass has constraints, and high-speed moving may spill the water from the glass. A soft part may transform with deflection when the soft part is moved at a high-speed. In such case, a large amount of resources may be allocated to the robot controller to record the events accurately.

In some aspects relating to a stopping operation including an emergency stop of the industrial robot arm or the joint motor, a large amount of resources may be allocated to the robot controller because of the speed and/or acceleration constraints. In some aspects, additional resources may be allocated to a device when a human is close to the device because the safety risk is raised. In some aspects, additional resources (compared to a resource allocation in a low-risk environment) may be allocated to an AGV when the AGV moves at a velocity above a threshold velocity because the high-speed movement is considered dangerous. On the other hand, resource allocation may be decreased when the AGV moves in low speed (e.g., with a velocity below a threshold velocity).

In some aspects, the resource allocation may be determined based on relative speeds of devices, moving objects, and/or environmental objects (e.g., moving objects on a belt conveyor) around an entity for which resources are allocated. In some aspects, the resource allocation may be controlled in accordance with a change of the surrounding environment.

In some aspects, the terminal device may be equipped with replay functions only if the terminal device does not have sensors.

Figure 16:
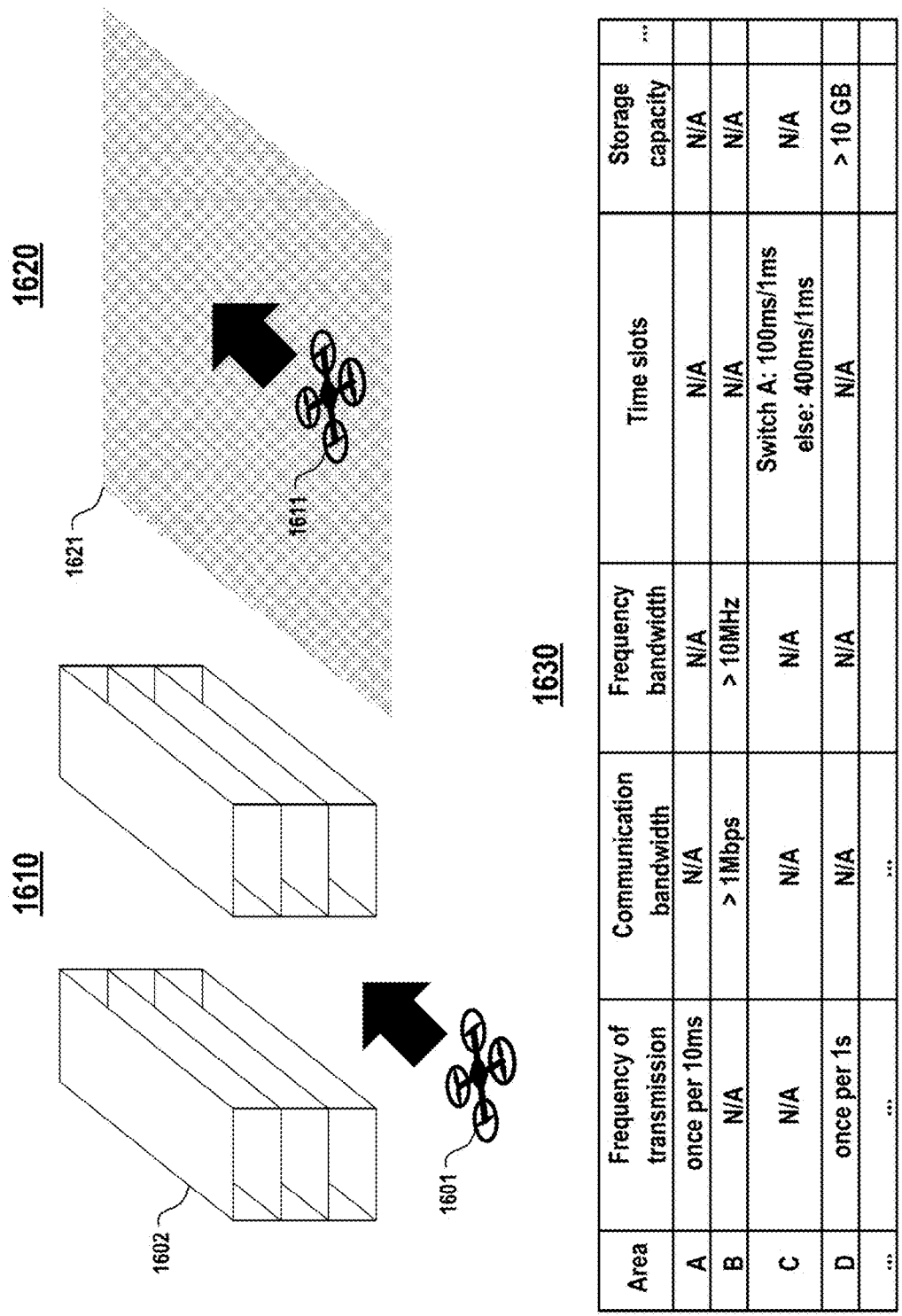
FIG. 16 is a set of diagrams illustrating a drone flying in different factory environments and a diagram indicating a set of configurations associated with different areas or states.

FIG. 16 is a set of diagrams 1610 and 1620 illustrating a drone 1601 flying in different factory environments and a diagram 1630 indicating a set of configurations associated with different areas or states. When the drone 1601 flies through a narrow way surrounded by shelves 1602 as illustrated in diagram 1610, a first (fine) granularity of resources may be allocated to the drone to record information (local control commands, control command received from a higher-level, e.g., an analysis, apparatus, state information such as height from the ground, velocity, angles, or other state variables) with fine granularity. In some aspects, the resource control apparatus may allocate a second (coarse) of resources to the drone 1611 when the drone flies through a large open space or an area 1621 with no obstacles as in diagram 1620.

A resource control apparatus, in some aspects, defines the rules for a resource allocation (e.g., a resource configuration) for each area, and applies a rule for resource allocation (e.g., selects a configured resource allocation) for the drone 1601 and/or 1611 in accordance with the position of the drone. To identify the location, the drone 1601 and/or 1611 may be equipped with a locating means such as simultaneous localization and mapping (SLAM) and/or sensors may be installed in each area to detect the drone 1601 and/or 1611. In some aspects, the resource allocation may be determined in accordance with area and/or location information, relational position with other devices nearby, the presence of a human, and/or the state of the drone including a transient response.

The resource control apparatus, in some aspects, may allocate resources in accordance with sensor results of the surrounding environment, sensed by sensors (e.g. a camera and/or a distance sensor) associated with the drone. For example, the resource control apparatus may allocate a large amount resources (e.g., for high-granularity logging) to the drone when the distance measured to other objects in the environment by a distance sensor is less than a threshold distance. The threshold distance, in some aspects, may be based on a velocity of the drone such that a threshold distance may be a distance that may be covered in a particular time period (e.g., 0.1 seconds). For example, the measured distance may be lower than a predefined threshold when the drone 1601 flies though a narrow way among shelves 1602 on both side as illustrated in diagram 1610 and the resource control apparatus may allocate a large amount of resources in such a case. Resource allocation based on surrounding environment, in some aspects, may not be limited to drones, but may be applied to the operation of AGVs, AMRs, and/or autonomous driving of vehicles.

In some aspects, the resource control apparatus may allocate resources in accordance with the extent of the area sensed by sensors associated with a mobile object. For example, when a mobile object associating with a camera sensor approaches an intersection beside obstacles or an area with bad visibility, a risk of collision with another object from outside the scope may be increased. The resource control apparatus may allocate a large amount resources to the mobile object for such case. By allocating a large amount of resources, the invention may accurately record the information regarding the dangerous situation caused by obstacles and the surrounding environment. The recorded logs may be utilized for safety measurement before and after the incidents. Therefore, the invention contributes to operate control systems safely.

In some aspects, the resource control apparatus may allocate resources in accordance with an extent of the affect area of an actuation. For example, an alarm that sounds for wide area can notify many workers of the warning, thus, it is an important notification means for hazardous situation. The resource control apparatus may, in some aspects, allocate larger resources to the alarm to record its safety operation. In some aspect, the resource control apparatus may control the resource allocation in accordance with an area. For example, resource control apparatus may allocate large resources to an area such as an intersection where many accidents occur or a collaborative area between a human and a robot where a safety risk is high.

As another example, the methods discussed above may be applied to autonomous driving of a vehicle in accordance with some aspects of the disclosure. A vehicle equipped with a wireless communication device, and a resource control apparatus may change the allocation of communication resources with the vehicle in accordance with situation. For example, the resource control apparatus may allocate a large amount of resources when a human is present near the vehicle while the vehicle is driving. In some aspects, the resource control apparatus may change the resource allocation in accordance with the distance and/or relative velocity with other vehicles running near the vehicle. For example, the resource control apparatus may increase the resource allocation when the vehicle is driving at high speed in a highway. Even though the vehicle is moving at low speed, the resource control apparatus may increase the resource allocation while the vehicle is in a traffic jam because the risk of collision with another vehicle in front and behind increases.

In some aspects, the resource control apparatus may change the resource allocation in accordance with the change of the surrounding environment. For example, because wireless communication gets difficult inside a tunnel or under an elevated structure, a resource control apparatus may increase the resource allocation to a vehicle before that the vehicle enters a tunnel or under an elevated structure, to improve the synchronization accuracy. In some aspects, a resource control apparatus may change the resource allocation when a vehicle drive through a point of frequent traffic accidents or a traffic junction. In some aspects, a resource control apparatus may change the resource allocation when a vehicle enters a pedestrian zone because the risk to approach a human is raised.

In some aspects, the invention is applicable to an electronic control unit (ECU) in an in-vehicle network where a GPS receiver and/or an ECU that communicates an external time synchronization master is the time synchronization master in the vehicle. That is, the ECU may change communication resources with the time synchronization master and/or resources of the ECU itself in accordance with the driving state of the vehicle. For example, the ECU may allocate a large amount of resources with ECUs related to sensors and/or actuators installed in front part of the vehicle when a traffic accident occurs ahead or workers are present (e.g., if a road is under construction). In some aspects, the ECU may allocate a large amount of resources with ECUs related to sensors and/or actuators installed in a particular (e.g., the left or right) side of the vehicle when the vehicle turns in the direction of the particular side, when the vehicle switches lanes to the particular side, when another vehicle is approaching the vehicle from the particular side, or another vehicle is passing the vehicle on the particular side. In some aspects, the ECU may allocate large resources with ECUs related to sensors and/or actuators installed in back part of the vehicle when the following vehicle approaches the vehicle as speeding up, or the following vehicle tailgates the vehicle. The recorded events related to autonomous driving can be used to improve an algorithm of the autonomous driving and to verify the safety driving. As another example, the methods discussed above may be applied to improve collision detection and/or prevention for a manually driven vehicle in accordance with some aspects of the disclosure.

The methods may be also applied to improve the performance of service robots in the healthcare field in accordance with some aspects of the disclosure. For example, in some aspects, service robots may support a person's movement and/or the daily life of a person with limited mobility or capacity by performing such mundane tasks as carrying a plate and/or cleaning. Additionally, surgical robots may assist in performing operations by being controlled by doctors. The resource control apparatus may control the resources in accordance with the state of the robots in such healthcare field. For example, the state may be categorized as one of a case that the robot perform actions on a person, a case that the robot does not perform actions on a person, but the person is near the robot, and a case that a person is not near the robot (e.g. during clearing or carrying an object). Each state may be associated with a different amount of resources (e.g., based on a calculated risk) as described in relation to FIGS. 10-15.

In some aspects, the resource control apparatus 120 may change resources in accordance with an area and/or location. For example, because a contact with a person is a greater risk in a waiting room in a hospital or home, the resource control apparatus may allocate a large amount of resources to robots in such an area, but the resource control apparatus may allocate a smaller amount of resources to the robot when the robot is in a space in a hospital dedicated for robots or restricted from humans. Accordingly, safety verification and improvement of the control algorithm for the robots may be provided to service robots in the healthcare field where the robots make take actions directly to persons.

In some aspects, the time resolution when recording may be modified as discussed in relation to FIGS. 6 and 13 as part of resource control. A time resolution may be changed in accordance with the state of the control system (e.g., as assessed at 602 of FIG. 6). The time resolution of a recorded log may be modified when a log registration unit registers the log in a log storage and/or when the log registration unit extracts the log from the log storage. An analysis apparatus or an operator may specify the time resolution when the analysis apparatus or the operator requests the log acquisition unit to acquire the log. The log acquisition unit may thin out the data sampled with high resolution (e.g., sensing time of an event is 1:00:05.123456800 nanoseconds) when the log acquisition unit is requested, and the log acquisition unit may provide the data for a requestor to perform accurate analysis. In some aspect, the log acquisition unit may provide sampled with low resolution (e.g., sensing time of an event is 1:00:05 seconds) to an external entity. When accurate analysis is not needed, this saves storage resource and/or communication resource.

In some aspects, the sampling frequency when recording may be modified in real time as discussed in relation to FIGS. 6 and 13 as part of resource control. A sampling frequency may be changed in accordance with the state of the control system (e.g., as assessed at 602 of FIG. 6). The sampling frequency of a recorded log may be modified when a log registration unit registers the log in a log storage and/or when the log registration unit extracts the log from the log storage. For example, a sensor may measure a characteristic (e.g., position, velocity, acceleration, or so on) at a first frequency (or a first rate) and the log registration unit may register a subset of the measurements at a second lower frequency (or a lower rate). An analysis apparatus or an operator may specify the sampling frequency when the analysis apparatus or the operator requests the log acquisition unit to acquire the log. The log acquisition unit may thin out the data sampled with high frequency when the log acquisition unit is requested, and the log acquisition unit may provide the data for a requestor. In some aspect, the log acquisition unit may perform data imputation to data sampled with low frequency and provide the data to an external entity.

Examples of resources to be controlled (e.g., at 602 of FIG. 6), in some aspects, may include one or more of a frequency of communication/transmission, communication bandwidth, frequency bandwidth, time slots, communication route, sampling frequency, resolution of sampling, storage capacity. When logs are recorded with fine time granularity in the log storage, the sampling frequency is shortened, and/or the high resolution of sampling is set. If an allocated storage capacity for events is not enough to accommodate an associated sampling rate, the allocation may be increased. Recording relations between humans, machines, and mobile objects with fine time granularity, in some aspects, may rely on improved time synchronization accuracy. To support improved time synchronization accuracy, in some aspects, may be associated with in increasing frequency of communications, communication bandwidth, frequency bandwidth, and/or time slots when performing a time synchronization communication protocol.

Communication routes may be changed based on a communication delay and/or synchronization accuracy. For example, a Boundary Clock (BC) and a Transparent Clock (TC) defined in IEEE 1588 are network relay switches that can improve the synchronization accuracy. Further, a low latency route or a fixed latency route may be preferred in some aspects of time synchronization. Thus, a route through a BC or a TC and/or the preferred route may be selected and allocated in the selection of the route between a time synchronization master and a terminal device. In some aspects, redundant communication routes may be used to communicate packets of a time synchronization protocol reliably. In such case, any of frequency of the communications, communication bandwidth, frequency bandwidth, time slots, communication routes may be allocated (e.g., increased) in order to achieve a target synchronization accuracy. For example, if only increasing of the frequency of the communications can achieve the target accuracy, other resources such as communication bandwidth, frequency bandwidth, and time slots may be unchanged.

In some aspects, an intermediate storage that collects information stored in each log storage of the multiple terminal devices may be deployed in the control system shown in FIG. 1. In some aspects, the resource control apparatus may provide the information collection function. In some aspects, the intermediate storage may remove the time from the collected information and store the collected information in order of the time received. The intermediate storage may be configured to save the storage capacity for an analysis of a system in case that only the occurrence order is just meaningful.

In some aspects, a source device of an event to be recorded, a time synchronization unit, a log registration unit, and/or the log storage may execute separated in different devices, and a communication delay may be introduced when identifying and recording an event. To record the event accurately, in some aspects, a deterministic and real-time network or a network being capable of measuring communication latency may be used to connect the source device with the recording device. A TSN or real-time Ethernet can provide the real-time and deterministic communications, and a Transparent Clock defined in IEEE 1588 can measure the residential time of a packet in the Transparent Clock. In some aspects, the log registration unit can subtract the communication delay from the acquired time at 803 in FIG. 8 when the log registration unit records a received event. An occurrence time of the event can be measured accurately by subtracting the fixed delay or the measured delay. In some aspects, when a log registration unit receives an event via a route with unknown communication delay, the log registration unit may record the event with an indication that the communication delay is unknown.

The terminal device, in some aspects, may communicate with another device that has no time synchronization function and/or log storage function, and may record events in the other device at the terminal device. Similarly, the terminal device, in some aspects, may communicate with the other device to provide an updated configuration and/or instruct the other device to execute the updated configuration (e.g., control commands associated with the other device in the updated configuration) as described in relation to FIGS. 13 and 14 for the terminal device. A recorded log may include the identification of the device and/or the identification of the event in the device. Low latency wired communication or short distance wireless communication is preferred for the connection with the device to record the event accurately. The device may be a fixed device installed at an area such as a camera and a curtain sensor nearby, or mobile object that gets close temporally such as an AGV and an AMR. The configuration, in some aspects, may obtain the benefit of the invention by substituting the terminal device for a device although the device does not have the time synchronization function and/or the log record function.

In some aspects, an event and a synchronized time may be recorded (e.g., by a log registration unit) and may be associated with an index indicating an accuracy of the time synchronization. In some aspects, the time synchronization may grow larger as an elapsed time since the last time synchronization with another device (e.g., a time synchronization master) grows larger. Accordingly, in some aspects, the time of the last time synchronization and/or the elapsed time since the last time synchronization may be used as the index. In some aspects, the time difference between a time received in a synchronization packet from a time synchronization master and the synchronized time of the device when receiving the synchronization packet may be used as the index. In some aspects, an index produced by leveling the time difference may be used.

When comparing the time received in a synchronization packet from the time synchronization master and the synchronized time at receiving, the communication latency with the time synchronization master, in some aspects, may be added to the received time from the time synchronization master if the communication latency is known or can be obtained. In some aspects, an identification of the time synchronization algorithm and/or a performance index of the time synchronization algorithm may be used because the time synchronization accuracy depends on the time synchronization algorithm performed by the time synchronization unit. In some aspects, the specification of the accuracy of the clock device such as an oscillator used in the device may be used as the index. Such index of the time synchronization accuracy, in some aspects, may be used to calculate an error, a deviation, or a confidence interval for a real time associated with a logged event.

In some aspects in which simulation analysis is sensitive to fine time differences and multiple events occur within extremely short time, simulating events using various timing in the time period based on a recorded index may be used to simulate events as described in relation to FIG. 13. Recording logs with the index, in some aspects, also allows an operator to recognize low time synchronization accuracy by receiving an alert, for example, when the elapsed time since the last time synchronization exceeds a threshold. Based on the alert, the operator may take measures to improve the stable operation of the invention.

In some aspects, a log acquisition unit may provide information extracted from the log storage on request from an external device such as an operator, a server, a cloud, a resource control apparatus, and/or a terminal device. If the log acquisition unit does not synchronize on the request due to communication error, abnormality in the log acquisition unit, or being in a set-up, the log acquisition unit may reject the request. The rejection includes a case that the elapsed time since the last time synchronization exceeds a threshold (e.g., indicating a long free-run situation). The log acquisition unit may determine if the log acquisition unit responds to the request or not, in accordance with the state of the control system and the time synchronization accuracy at recording the requested log. For example, highly accurate synchronization at recording the requested log is preferred when the requested log is associated with a fine time granularity (e.g., when a machine and a worker are close, or a mobile object approaches an intersection). On the other hand, highly accurate synchronization at recording the requested log may not be available or desired when a device operates with low speed and/or no events occurred around a device. Accordingly, low-accuracy synchronization at recording the requested log may be sufficient for an application and the requested log may be provided.

In some aspects, an improved control algorithm generated by the analysis process illustrated in FIG. 13 may be delivered to another device different from the original source device of the analyzed logs. Such delivery may be performed when a device corresponds to the state of the stored information in the original device. For example, when a control algorithm for an industrial robot arm along a production line is improved, the improved algorithm may be delivered to a different robot in the same situation. In some aspect, when a control algorithm for a drone or an autonomous driving car in a particular area is improved, the improved algorithm may be delivered to a different drone or autonomous driving car passing the same area. The process, in some aspects, may include real-time updating of a control algorithm. For example, the analysis apparatus may deliver an improved control algorithm to a device determined to be in (or to be entering into) the same state as the original device for which the control algorithm was produced after the improvement of a control algorithm shown in FIG. 13.

In some aspects, a terminal device may respond to a request for resource control from a resource control unit. If the terminal device rejects a request or does not respond, the resource control apparatus may present an alert via one or more of a notification, a GUI, or other presenting means, e.g., a warning lamp or other physical indicator. In some aspects, if the terminal device rejects a request, the terminal device may provide a reason for the rejection. Examples of the reason for a rejection may include one or more of resource starvation, a lack of control means in the terminal device, and abnormality in software and/or hardware. The reason may be presented in a predefined error code.

In some aspects, a terminal device or an I/O control device may change its behavior based on an indication from an I/O resource control unit, to improve log recording. For example, if high speed moving of the terminal device or the I/O control device causes unstable communication of a time synchronization protocol, the terminal device or the I/O control device may reduce speed or stop. With behavior changed, the accuracy of log recording can be improved, so the history of the device action can be verified and analyzed accurately, for example, when a mobile object approaches an intersection.

The one or more of the resource control unit, the communication resource control unit, the storage resource control unit, the computer resource control unit, and the I/O resource control unit may be configured according to a hierarchical structure over a plurality of the resource control apparatus. For example, a resource control unit to control resources may be deployed for an area, and an integrated resource control unit to manage the set of the resource control units may be deployed for an integrated area combining a plurality of areas. Other categorization may be based on the type of target objects, and/or time period. A human may be a category in the categorization based on the type.

In some aspects, the resource control apparatus may allocate larger resources to a terminal device (or actuator) that has larger number of component devices associated with sensors (or actuators) or a terminal device with sensors (or actuators) that cover a larger space when the resource control apparatus assigns resources to a plurality of the terminal devices. For example, a camera can monitor a plurality of terminal devices in a monitoring area. LiDAR sensors can compare their monitoring space by their specification. Additionally, or alternatively, a terminal device providing the time synchronization function and/or log recording function for other devices may be identified as being related to the other devices and the resource control apparatus may assign resources in accordance with the number of related devices and/or sensing space.

The invention, in some aspects is configured to utilize energy efficiently, so that the invention can reduce energy consumption based on the resource control apparatus assigning resources in accordance with the control state of each component of the system. The energy conservation may, e.g., be based on a control state including a risk level as discussed above and a battery level of a system component (e.g., a component such as an AGV or an AMR) being powered by a battery.

Figure 17:
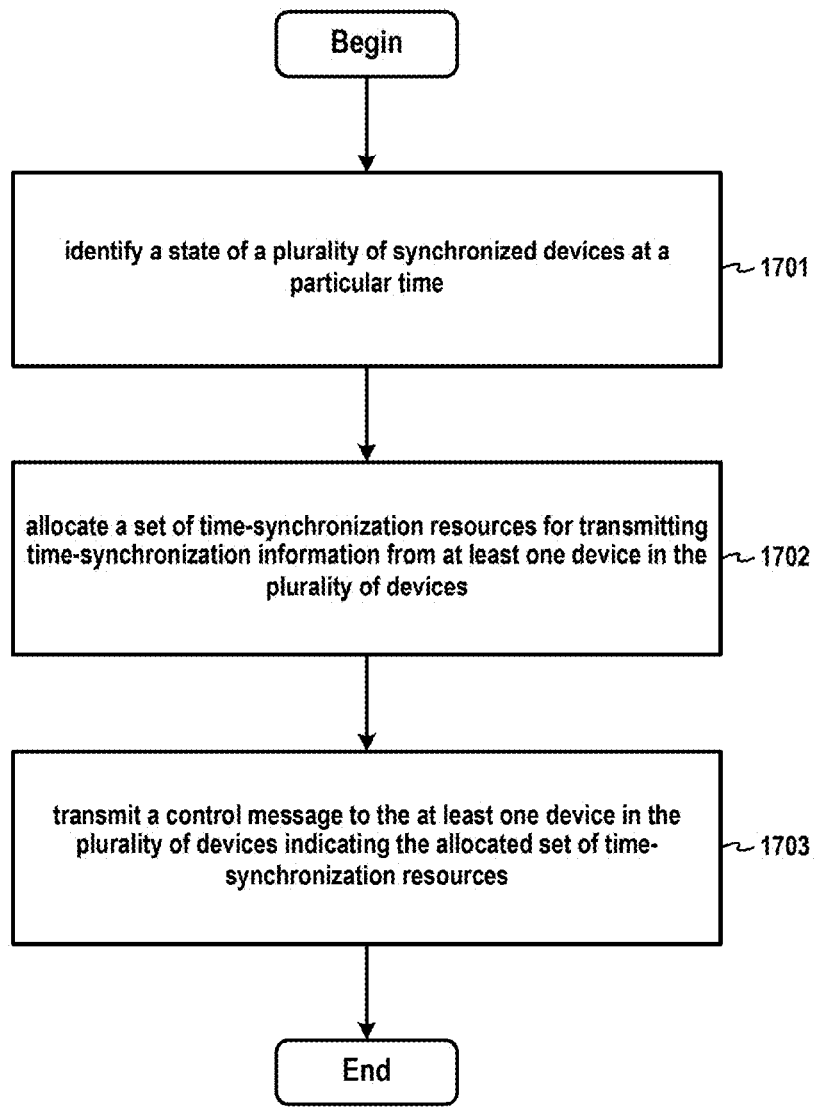
FIG. 17 is a flow diagram illustrating a method in accordance with some aspects of the disclosure.

FIG. 17 is a flow diagram 1700 illustrating a method in accordance with some aspects of the disclosure. In some aspects, the method is performed by an analysis apparatus (e.g., analysis apparatus 1262 or computing device 2005) that performs various analyses, modification of control algorithm and/or applications, simulation, and/or emulation based on logged events. At 1710, the analysis apparatus may identify a state of a plurality of synchronized devices (e.g., a state of the control system) at a particular time. In some aspects, the state of the control system may relate to one or more of a type of at least one device, a surrounding environment of the at least one device, or a change of a relation between the at least one device and at least one other device in the plurality of devices. The state of the control system, in some aspects, may include one or more of a type of the at least one other device, a presence of a human, a distance to the at least one other device or the human, a relative velocity between the at least one device and the at least one other device or the human, or a relative acceleration between the at least one device and the at least one other device or the human. In some aspects, the state of the control system may relate to one or more transitory properties of the at least one device, where the transitory properties comprise one of a velocity or an acceleration of the at least one device. The state of the control system, in some aspects, may include an indication of at least one device transitioning from a steady state to a dynamic state or one or more of a location of the at least one device, a shape of the surrounding environment of the at least one device, an area of the surrounding environment of the at least one device, an area sensed by the at least one device, or an area accessible to the at least one device.

For example, referring to FIG. 6, In some aspects, the state of the control system may be determined at 602. The state of the control system determined at 602 may include a state of a set of terminal devices and a communication network (e.g., a state of the set of network relay devices, wireless base stations, I/O control devices, etc.) that provides communication between the control system and the terminal devices. The state of a terminal device, in some aspects, may include an identification of the type of device (e.g., a localized robotic agent, an autonomous object, or other controllable device), a set of transitory properties of the terminal device such as a velocity or an acceleration, an indication of whether the terminal device is in a dynamic state or a steady state, information regarding an environment of the terminal device, a location of the terminal device, information regarding a set of other objects in the vicinity of the terminal device (e.g., a type of object, a distance, a relative velocity, a relative acceleration, and/or other relevant information). The state of the communication network may include an identification of available paths and/or routes through the communication network to different terminal devices, resources (e.g., used and available resources) associated with each path and/or route through the communication network. In some aspects, the determination at 602 may be based on determining and/or detecting that a triggering event (e.g., an event triggering resource control) occurs at 601.

At 1702, the analysis apparatus may allocate, based on the identified state of each of the plurality of synchronized devices at 1701, a set of time-synchronization resources for transmitting time-synchronization information from at least one device in the plurality of devices. The allocated set of time-synchronization resources, in some aspects, may include one or more of time resources in a set of slots, frequency resources in a frequency range, bandwidth resources, or communication route resources, where the set of time resources are associated with one or more of a wired communication network or a wireless communication network. The aforementioned time-synchronization resources, in some aspects, may be referred to as time-synchronization communication resources. The set of time-synchronization resources, in some aspects, may include a set of logging parameters for recording sensor data associated with at the at least one device. The logging parameters, in some aspects, may relate to one or more of a duration of each data recording event in a plurality of data recording events, a frequency of the data recording events in the plurality of data recording events, a resolution of sensor data collected during each data recording event in the plurality of data recording events, or an allocation for data storage for the sensor data collected during one or more of the data recording events in the plurality of data recording events. In some aspects, an existing set of logging parameters before the allocation at 1702 may be changed (e.g., updated) based on the state of the at least one device or the control system by the allocation at 1702. The aforementioned logging parameters, in some aspects, may be referred to as time-synchronization recording and/or reporting resources and may relate to events (e.g., data recording events) that the analysis apparatus (e.g., an operator of the control system) has determined to monitor.

In some aspects, the set of logging parameters in the set of time-synchronization resources may be a first set of logging parameters that indicates for the at least one device to begin recording data for a data recording event at a same time as at least one other device in the plurality of devices begins recording data for the data recording event. The set of time-synchronization resources, in some aspects, may include a second set of logging parameters for the at least one other device indicating a frequency of the data recording events that is one of equal to the frequency of the data recording events indicated in the first set of logging parameters or is an integer multiple of the frequency of the data recording events indicated in the first set of logging parameters. In some aspects, resources controlled by the resource control apparatus may include a transmission frequency of packets in a time synchronization protocol, a sampling frequency of events, sampling resolution of events, and/or storage capacity allocation for events. The resources controlled by the resource control apparatus may, in some aspects, include a set of timeslots and/or a frequency band in wireless communication, timeslots for time division communication such as TSN, and/or route selection of the synchronization packets from the view of synchronization accuracy and communication latency. For example, referring to FIGS. 6 and 13, the analysis apparatus may perform, at 604 or 1306, a resource allocation associated with a resource control operation.

Finally, at 1703, the analysis apparatus may transmit a control message to the at least one device in the plurality of devices indicating the allocated set of time-synchronization resources determined for transmitting the time-synchronization information from the at least one device. The control message transmitted at 1703 to the at least one device may include an indication of any of the time-synchronization communication resources, the time-synchronization recording and/or reporting resources, or a set of control commands. For example, referring to FIGS. 6 and 13, the analysis apparatus may transmit the control message as part of the resource control operation at 604 or when exporting the configuration at 1307.

Figure 18:
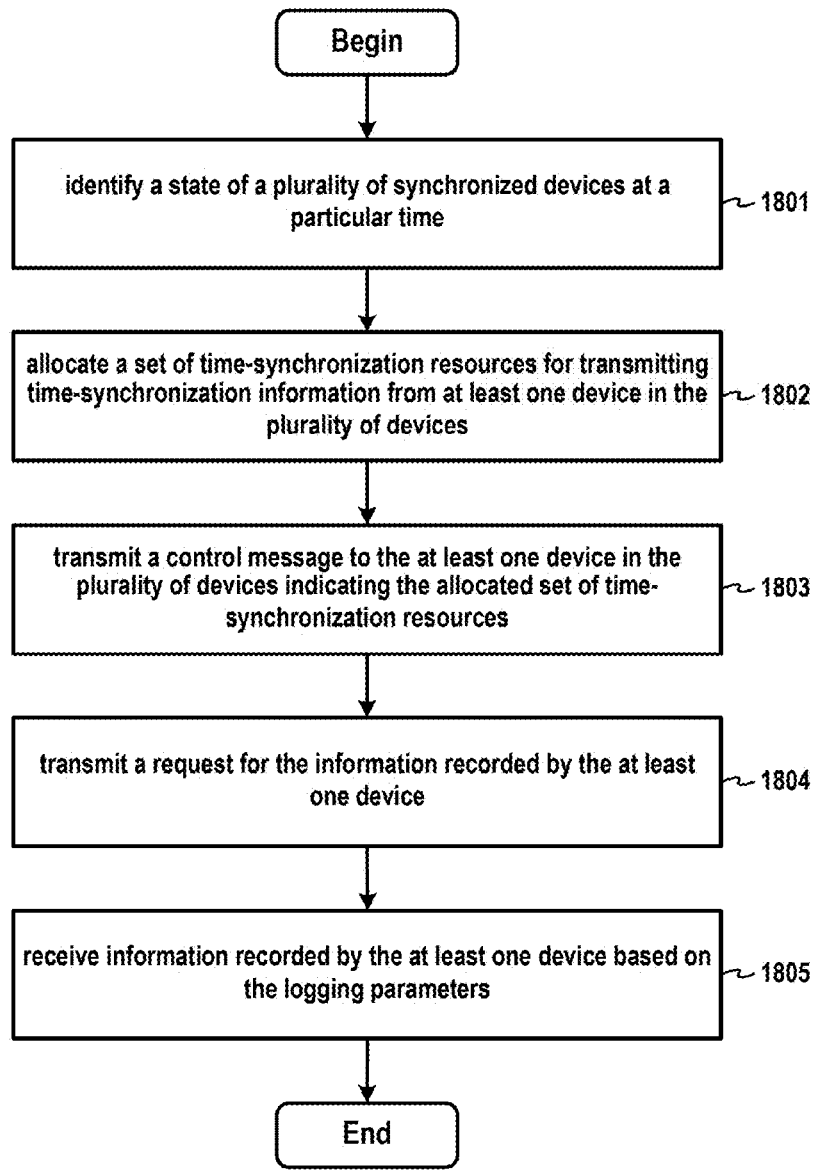
FIG. 18 is a flow diagram illustrating a method in accordance with some aspects of the disclosure.

FIG. 18 is a flow diagram 1800 illustrating a method in accordance with some aspects of the disclosure. In some aspects, the method is performed by an analysis apparatus (e.g., analysis apparatus 1262 or computing device 2005) that performs various analyses, modification of control algorithm and/or applications, simulation, and/or emulation based on logged events. At 1810, the analysis apparatus may identify a state of a plurality of synchronized devices (e.g., a state of the control system) at a particular time. In some aspects, the state of the control system may relate to one or more of a type of at least one device, a surrounding environment of the at least one device, or a change of a relation between the at least one device and at least one other device in the plurality of devices. The state of the control system, in some aspects, may include one or more of a type of the at least one other device, a presence of a human, a distance to the at least one other device or the human, a relative velocity between the at least one device and the at least one other device or the human, or a relative acceleration between the at least one device and the at least one other device or the human. In some aspects, the state of the control system may relate to one or more transitory properties of the at least one device, where the transitory properties comprise one of a velocity or an acceleration of the at least one device. The state of the control system, in some aspects, may include an indication of at least one device transitioning from a steady state to a dynamic state or one or more of a location of the at least one device, a shape of the surrounding environment of the at least one device, an area of the surrounding environment of the at least one device, an area sensed by the at least one device, or an area accessible to the at least one device.

For example, referring to FIG. 6, In some aspects, the state of the control system may be determined at 602. The state of the control system determined at 602 may include a state of a set of terminal devices and a communication network (e.g., a state of the set of network relay devices, wireless base stations, I/O control devices, etc.) that provides communication between the control system and the terminal devices. The state of a terminal device, in some aspects, may include an identification of the type of device (e.g., a localized robotic agent, an autonomous object, or other controllable device), a set of transitory properties of the terminal device such as a velocity or an acceleration, an indication of whether the terminal device is in a dynamic state or a steady state, information regarding an environment of the terminal device, a location of the terminal device, information regarding a set of other objects in the vicinity of the terminal device (e.g., a type of object, a distance, a relative velocity, a relative acceleration, and/or other relevant information). The state of the communication network may include an identification of available paths and/or routes through the communication network to different terminal devices, resources (e.g., used and available resources) associated with each path and/or route through the communication network. In some aspects, the determination at 602 may be based on determining and/or detecting that a triggering event (e.g., an event triggering resource control) occurs at 601.

At 1802, the analysis apparatus may allocate, based on the identified state of each of the plurality of synchronized devices at 1801, a set of time-synchronization resources for transmitting time-synchronization information from at least one device in the plurality of devices. The allocated set of time-synchronization resources, in some aspects, may include one or more of time resources in a set of slots, frequency resources in a frequency range, bandwidth resources, or communication route resources, where the set of time resources are associated with one or more of a wired communication network or a wireless communication network. The set of time-synchronization resources, in some aspects, may include a set of logging parameters for recording sensor data associated with at the at least one device. The logging parameters, in some aspects, may relate to one or more of a duration of each data recording event in a plurality of data recording events, a frequency of the data recording events in the plurality of data recording events, a resolution of sensor data collected during each data recording event in the plurality of data recording events, or an allocation for data storage for the sensor data collected during one or more of the data recording events in the plurality of data recording events. In some aspects, an existing set of logging parameters before the allocation at 1802 may be changed (e.g., updated) based on the state of the at least one device or the control system by the allocation at 1802.

In some aspects, the set of logging parameters in the set of time-synchronization resources may be a first set of logging parameters that indicates for the at least one device to begin recording data for a data recording event at a same time as at least one other device in the plurality of devices begins recording data for the data recording event. The set of time-synchronization resources, in some aspects, may include a second set of logging parameters for the at least one other device indicating a frequency of the data recording events that is one of equal to the frequency of the data recording events indicated in the first set of logging parameters or is an integer multiple of the frequency of the data recording events indicated in the first set of logging parameters. In some aspects, resources controlled by the resource control apparatus may include a transmission frequency of packets in a time synchronization protocol, a sampling frequency of events, sampling resolution of events, and/or storage capacity allocation for events. The resources controlled by the resource control apparatus may, in some aspects, include a set of timeslots and/or a frequency band in wireless communication, timeslots for time division communication such as TSN, and/or route selection of the synchronization packets from the view of synchronization accuracy and communication latency. For example, referring to FIGS. 6 and 13, the analysis apparatus may perform, at 604 or 1306, a resource allocation associated with a resource control operation.

At 1803, the analysis apparatus may transmit a control message to the at least one device in the plurality of devices indicating the allocated set of time-synchronization resources determined for transmitting the time-synchronization information from the at least one device. The control message transmitted at 1803 to the at least one device may include an indication of any of the time-synchronization communication resources, the time-synchronization recording and/or reporting resources, or a set of control commands. For example, referring to FIGS. 6 and 13, the analysis apparatus may transmit the control message as part of the resource control operation at 604 or when exporting the configuration at 1307.

At 1804, the analysis apparatus may transmit a request for information recorded by the at least one device. In some aspects, the request for the information may be implicit within a set of logging parameters in the set of time-synchronization resources. For example, referring to FIGS. 6 and 13, the analysis apparatus may export the configuration at 1307 in order to update the components of the control system (e.g., as part of the resource control operation at 604). Finally, at 1805, the analysis apparatus may receive information recorded by the at least one device based on the logging parameters. In some aspects, receiving the information recorded by the at least one device may be based on the request transmitted at 1804. For example, referring to FIGS. 6 and 13, the analysis apparatus may receive information recorded by the at least one device based on the logging parameters as part of determining the state of the control system at 602 and/or obtain event information at 1301.

Figure 19:
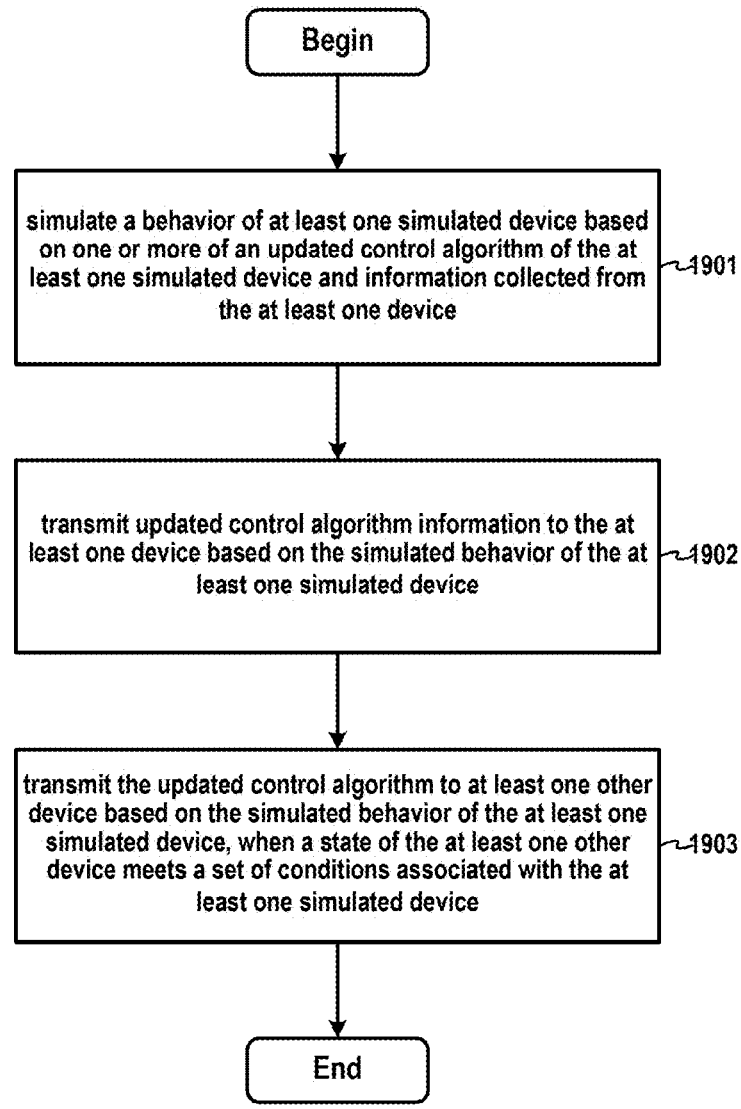
FIG. 19 is a flow diagram illustrating a method in accordance with some aspects of the disclosure.

FIG. 19 is a flow diagram 1900 illustrating a method in accordance with some aspects of the disclosure. In some aspects, the method is performed by an analysis apparatus (e.g., analysis apparatus 1262 or computing device 2005) that performs various analyses, modification of control algorithm and/or applications, simulation, and/or emulation based on logged events. The method illustrated in flow diagram 1900, in some aspects, may be performed in parallel, or as a part of the methods illustrated in the flow diagrams 1700 and 1800. At 1901, the analysis apparatus may simulate a behavior of at least one (simulated) device based on one or more of an updated control algorithm of the at least one simulated device and information collected from the at least one device. In some aspects, the analysis apparatus may simulate one or more components of the control system based on state information identified (e.g., at 1701 and/or 1801) and/or received by the analysis apparatus (e.g., at 1805) and may generate an updated control algorithm based on a first result of the simulation. One or more subsequent simulations may be executed based on the state information and the updated control algorithm to generate additional updated control algorithms for improving outcomes of the simulation. For example, referring to FIG. 13, the analysis apparatus may, at 1303, reproduce the stored events through a simulation or an emulation from the collected information, the complemented information generated at 1302, and the control logics associated with configuring, at 1306, the simulated environment for a next iteration of the simulation and/or emulation.

At 1902, the analysis apparatus may transmit updated control algorithm information to the at least one device based on the simulated behavior of the at least one simulated device. The updated control algorithm information may include an updated set of time-synchronization resources (e.g., including time-synchronization communication resources, time-synchronization recording and/or reporting resources, and/or a control algorithm and/or logic associated with a set of control commands). For example, referring to FIG. 13, the analysis apparatus may export at 1307, the configuration in order to update the components of the control system.

Finally, at 1903, the analysis apparatus may transmit the updated control algorithm to at least one other device based on the simulated behavior of the at least one simulated device. In some aspects, the updated control algorithm may be transmitted to the at least one other device based on a state of the at least one other device meeting a set of conditions associated with the at least one simulated device. As discussed above, an updated control configuration generated for, or based on, a first terminal device, in some aspects, may be transmitted to an additional terminal device with a same function. For example, referring to FIG. 13, an improved control algorithm generated by the analysis process illustrated in FIG. 13 may be delivered to another device different from the original source device of the analyzed logs.

As discussed above, an allocation of resources related to log recording is controlled, in some aspects, in accordance with the state of a control system, a human, a robot, an autonomous mobile object, and a control apparatus for recording behaviors in a control system, so that the behaviors of a plurality of entities in the control system and interaction between the entities are recorded accurately. Further, the recorded behaviors and/or interactions are verified and optimized by an analysis with simulation in a virtual space, so that the system operation is improved. Therefore, it is possible to verify the safety and optimize the control system operation, so that the safety, reliability, performance, efficiency of the operation is improved.

Figure 20:
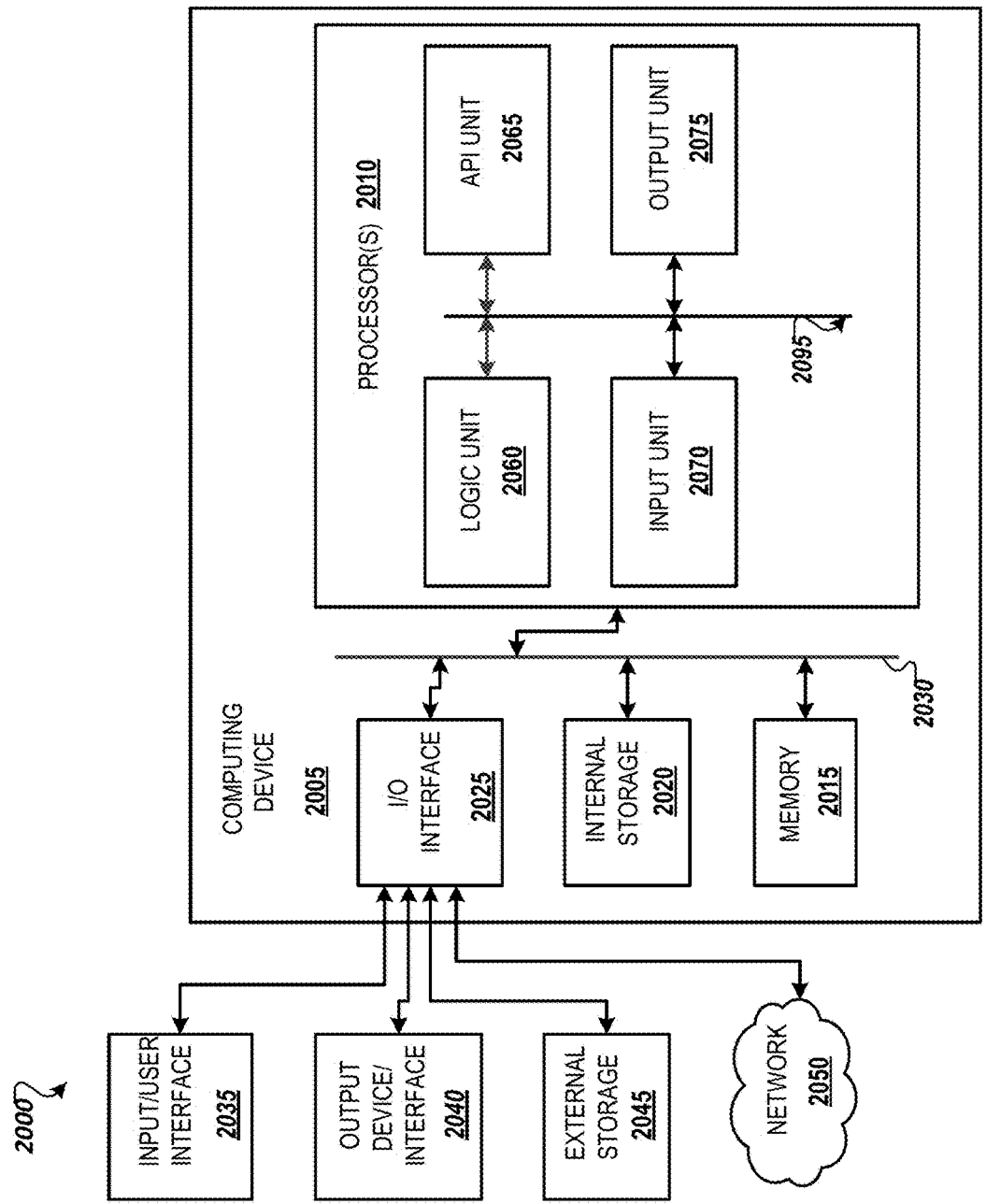
FIG. 20 illustrates an example computing environment with an example computer device suitable for use in some example implementations.

FIG. 20 illustrates an example computing environment with an example computer device suitable for use in some example implementations. Computer device 2005 in computing environment 2000 can include one or more processing units, cores, or processors 2010, memory 2015 (e.g., RAM, ROM, and/or the like), internal storage 2020 (e.g., magnetic, optical, solid-state storage, and/or organic), and/or IO interface 2025, any of which can be coupled on a communication mechanism or bus 2030 for communicating information or embedded in the computer device 2005. IO interface 2025 is also configured to receive images from cameras or provide images to projectors or displays, depending on the desired implementation.

Computer device 2005 can be communicatively coupled to input/user interface 2035 and output device/interface 2040. Either one or both of the input/user interface 2035 and output device/interface 2040 can be a wired or wireless interface and can be detachable. Input/user interface 2035 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 2040 may include a display, television, monitor, printer, speaker, braille, or the like. In some example implementations, input/user interface 2035 and output device/interface 2040 can be embedded with or physically coupled to the computer device 2005. In other example implementations, other computer devices may function as or provide the functions of input/user interface 2035 and output device/interface 2040 for a computer device 2005.

Examples of computer device 2005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2005 can be communicatively coupled (e.g., via IO interface 2025) to external storage 2045 and network 2050 for communicating with any number of networked components, devices, and systems, including one or more computer devices of the same or different configuration. Computer device 2005 or any connected computer device can be functioning as, providing services of, or referred to as a server, client, thin server, general machine, special-purpose machine, or another label.

IO interface 2025 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 2000. Network 2050 can be any network or combination of networks (e.g., the Internet, local area network, wide area network, a telephonic network, a cellular network, satellite network, and the like).

Computer device 2005 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 2005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 2010 can execute under any operating system (OS) (not shown), in a native or virtual environment. One or more applications can be deployed that include logic unit 2060, application programming interface (API) unit 2065, input unit 2070, output unit 2075, and inter-unit communication mechanism 2095 for the different units to communicate with each other, with the OS, and with other applications (not shown). The described units and elements can be varied in design, function, configuration, or implementation and are not limited to the descriptions provided. Processor(s) 2010 can be in the form of hardware processors such as central processing units (CPUs) or in a combination of hardware and software units.

In some example implementations, when information or an execution instruction is received by API unit 2065, it may be communicated to one or more other units (e.g., logic unit 2060, input unit 2070, output unit 2075). In some instances, logic unit 2060 may be configured to control the information flow among the units and direct the services provided by API unit 2065, the input unit 2070, the output unit 2075, in some example implementations described above. For example, the flow of one or more processes or implementations may be controlled by logic unit 2060 alone or in conjunction with API unit 2065. The input unit 2070 may be configured to obtain input for the calculations described in the example implementations, and the output unit 2075 may be configured to provide an output based on the calculations described in example implementations.

Processor(s) 2010 can be configured to identify a state of a plurality of synchronized devices at a particular time. The processor(s) 2010 can be configured to allocate, based on the identified state of each of the plurality of synchronized devices, a set of time-synchronization resources for transmitting time-synchronization information from at least one device in the plurality of devices. The processor(s) 2010 can be configured to transmit a control message to the at least one device in the plurality of devices indicating the allocated set of time-synchronization resources determined for transmitting the time-synchronization information from the at least one device. The processor(s) 2010 can be configured to receive information recorded by the at least one device based on a set of logging parameters for recording sensor data associated with at the at least one device. The processor(s) 2010 can be configured to transmit a request for the information recorded by the at least one device. The processor(s) 2010 can be configured to calculate the force and the moment for each time step during the measurement of the response based on the second intermediate matrix and the modal properties.

The processor(s) 2010 can also be configured to simulate a behavior of at least one simulated device based on one or more of an updated control algorithm of the at least one simulated device and information collected from the at least one device. The processor(s) 2010 can also be configured to transmit updated control algorithm information to the at least one device based on the simulated behavior of the at least one simulated device. The processor(s) 2010 can also be configured to transmit the updated control algorithm to at least one other device based on the simulated behavior of the at least one simulated device, when a state of the at least one other device meets a set of conditions associated with the at least one simulated device.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
identifying a state of a plurality of synchronized devices at a particular time;
allocating, based on the identified state of each of the plurality of synchronized devices, a set of time-synchronization resources for transmitting time-synchronization information from at least one device in the plurality of synchronized devices; and
transmitting a control message to the at least one device in the plurality of synchronized devices indicating the allocated set of time-synchronization resources determined for transmitting the time-synchronization information from the at least one device, wherein the set of time-synchronization resources comprises a set of logging parameters for recording sensor data associated with the at least one device; and
receiving information recorded by the at least one device based on the set of logging parameters, wherein the set of logging parameters is changed based on the state of the at least one device.

2. The method of claim 1, wherein the set of time-synchronization resources comprises one or more of time resources in a set of slots, frequency resources in a frequency range, bandwidth resources, or communication route resources, wherein the set of time-synchronization resources are associated with one or more of a wired communication network or a wireless communication network.

3. The method of claim 1, wherein allocating the set of time-synchronization resources is based on one or more of a type of the at least one device, a surrounding environment of the at least one device, or a change of a relation between the at least one device and at least one other device in the plurality of synchronized devices.

4. The method of claim 3, wherein allocating the set of time-synchronization resources is based on one or more transitory properties of the at least one device, wherein the one or more transitory properties comprise one of a velocity or an acceleration of the at least one device.

5. The method of claim 3, wherein allocating the set of time-synchronization resources comprises updating a previous allocation of time-synchronization resources.

6. The method of claim 3, wherein allocating the set of time-synchronization resources is further based on the at least one device transitioning from a steady state to a dynamic state.

7. The method of claim 3, wherein allocating the set of time-synchronization resources is further based on one or more of a type of the at least one other device, a presence of a human, a distance to the at least one other device or the human, a relative velocity between the at least one device and the at least one other device or the human, or a relative acceleration between the at least one device and the at least one other device or the human.

8. The method of claim 3, wherein allocating the set of time-synchronization resources is further based on one or more of a shape of the surrounding environment of the at least one device, an area of the surrounding environment of the at least one device, an area sensed by the at least one device, or an area accessible to the at least one device.

9. The method of claim 3, wherein allocating the set of time-synchronization resources is further based on a location of the at least one device.

10. The method of claim 1, wherein the set of logging parameters relate to one or more of a duration of each data recording event in a plurality of data recording events, a frequency of the data recording events in the plurality of data recording events, a resolution of sensor data collected during each data recording event in the plurality of data recording events, or an allocation for data storage for the sensor data collected during one or more of the data recording events in the plurality of data recording events.

11. The method of claim 1, wherein the set of logging parameters is a first set of logging parameters that indicates for the at least one device to begin recording data for a data recording event at a same time as at least one other device in the plurality of synchronized devices begins recording data for the data recording event, wherein a second set of logging parameters for the at least one other device indicates a frequency of the data recording events that is one of equal to the frequency of the data recording events indicated in the first set of logging parameters or is an integer multiple of the frequency of the data recording events indicated in the first set of logging parameters.

12. The method of claim 1, further comprising:
transmitting a request for the information recorded by the at least one device, wherein receiving the information recorded by the at least one device is based on the request.

13. The method of claim 1, wherein the received information recorded by the at least one device comprises a transformed time based on a first time stored by the at least one device and a reference time difference.

14. The method of claim 1, wherein the received information recorded by the at least one device comprises an index of a time-synchronization accuracy of information recorded by the at least one device.

15. The method of claim 1, further comprising:
simulating a behavior of at least one simulated device based on one or more of an updated control algorithm of the at least one simulated device and information collected from the at least one device; and
transmitting updated control algorithm information to the at least one device based on the simulated behavior of the at least one simulated device.

16. The method of claim 15, further comprising:
transmitting the updated control algorithm to at least one other device based on the simulated behavior of the at least one simulated device, when a state of the at least one other device meets a set of conditions associated with the at least one simulated device.

17. An apparatus comprising:
a memory; and
at least one processor coupled to the memory and, based at least in part on information stored in the memory, the at least one processor is configured to:
identify a state of a plurality of synchronized devices at a particular time;
allocate, based on the identified state of each of the plurality of synchronized devices, a set of time-synchronization resources for transmitting time-synchronization information from at least one device in the plurality of synchronized devices; and transmit a control message to the at least one device in the plurality of synchronized devices indicating the allocated set of time-synchronization resources determined for transmitting the time-synchronization information from the at least one device, wherein the set of time-synchronization resources comprises a set of logging parameters for recording sensor data associated with the at least one device; and receiving information recorded by the at least one device based on the set of logging parameters, wherein the set of logging parameters is changed based on the state of the at least one device.

18. A non-transitory computer-readable medium storing computer executable code, the computer executable code when executed by a processor causes the processor to:

identify a state of a plurality of synchronized devices at a particular time;

allocate, based on the identified state of each of the plurality of synchronized devices, a set of time-synchronization resources for transmitting time-synchronization information from at least one device in the plurality of synchronized devices; and transmit a control message to the at least one device in the plurality of synchronized devices indicating the allocated set of time-synchronization resources determined for transmitting the time-synchronization information from the at least one device, wherein the set of time-synchronization resources comprises a set of logging parameters for recording sensor data associated with the at least one device; and receiving information recorded by the at least one device based on the set of logging parameters, wherein the set of logging parameters is changed based on the state of the at least one device.

* * * * *